(12) United States Patent
Sasamata

(10) Patent No.: US 7,926,936 B2
(45) Date of Patent: Apr. 19, 2011

(54) EYEGLASS LENS CONNECTOR, EYEGLASSES WITH INTERCHANGEABLE LENSES, AND LENS-FORMING SUBSTRATE

(75) Inventor: Tsuneo Sasamata, Sabae (JP)

(73) Assignees: SUN-RAY Corporation, Osaka-shi (JP); Sasamata Co., Ltd., Sabae-shi (JP)

( * ) Notice: Subject to any disclaimer, the term of this patent is extended or adjusted under 35 U.S.C. 154(b) by 0 days.

(21) Appl. No.: 12/470,494

(22) Filed: May 22, 2009

(65) Prior Publication Data
US 2010/0188635 A1   Jul. 29, 2010

(30) Foreign Application Priority Data

Jan. 26, 2009 (JP) ................................. 2009-001367
Feb. 3, 2009 (JP) .............................. 2009-000471 U

(51) Int. Cl.
*G02C 1/02* (2006.01)
(52) U.S. Cl. ........................... 351/110; 351/57; 351/149
(58) Field of Classification Search ................... 351/47, 351/48, 57, 58, 110, 140, 141, 149, 150, 351/178
See application file for complete search history.

(56) References Cited

U.S. PATENT DOCUMENTS 6,199,981 B1 * 3/2001 Chao ............................. 351/110
2005/0206836 A1 * 9/2005 Shapiro ......................... 351/110

* cited by examiner

*Primary Examiner* — Huy K Mai
(74) *Attorney, Agent, or Firm* — Judge Patent Associates

(57) ABSTRACT

Eyeglass lens connector with single-operation interchangeable lenses. The configuration enables cutting lenses with the connector body alone mounted to the lens substrate, allowing eyeglasses to be assembled by utilizing the connector after the lens is cut on demand from a customer. The eyeglasses have a lens connector (1) connecting a lens (5) to an insertion piece of a lens connecting member (2), and an insertion hole (10) for the insertion piece (3). A guide groove for guiding a tip of the engagement piece (3) is provided along the opening end (13) of the insertion hole (10). The lens connector (1) is secured to the lens (5) by fastening two protruding fastening pins (32) into fastening holes (29) provided in the lens (5). The lens (5) is connectable to the lens connecting member (2) by squeezing the insertion piece (3) into the insertion hole (10).

13 Claims, 22 Drawing Sheets

EYEGLASS LENS CONNECTOR, EYEGLASSES WITH INTERCHANGEABLE LENSES, AND LENS-FORMING SUBSTRATE

BACKGROUND OF THE INVENTION

1. Technical Field

The present invention relates to a eyeglass lens connector with interchangeable lenses, and relates to eyeglasses with interchangeable lenses using the lens connector. In addition, the present invention relates to a lens forming substrate using the eyeglass lens connector.

2. Description of the Related Art

There are several types of eyeglasses for the intended use. For example, there are clip-on eyeglasses configured to enable sunglasses to be worn by detachably clipping them onto the main eyeglass frames.

Examples of clip-on eyeglasses include clip-on eyeglasses mounted to body eyeglasses via clips to be flippable as disclosed in 1. Japanese Unexamined Utility Model Application Publication S58-91721 and 2. Japanese Unexamined Patent Application Publication S50-120641, and clip-on eyeglasses mounted to body eyeglasses to be flippable via elastic curved engagement pieces that can be engaged to outer edges or inner edges of right and left lenses of the body eyeglasses as disclosed in 3. Japanese Unexamined Patent Application Publication 2003-241149. Alternatively, other clip-on eyeglasses equipped with both attachment lenses for covering both lenses of the body eyeglasses from the front surface side are detachable to the lens frame of the body eyeglasses, but not flip-up type as disclosed in 4. Japanese Utility Model Registration 3117580 and 5. Japanese Utility Model Registration 3125901.

Among these clip-on eyeglasses, when the eyeglasses configured to be flippable are mounted to the body eyeglasses, the eyeglasses can be used as sunglasses when the clip-on eyeglasses are down; in the meantime, when a user enters a dark place, such as a tunnel during driving a car, flipping-up the lenses enables securing and seeing the field of vision with the body eyeglasses and to secure safe driving.

In addition, flip-up eyeglasses where lenses are mounted to upper cord parts to be flippable so as to cover the lower portions (portions facing eyes) of the upper cord parts of the both front frames of eyeglasses whose right and left upper cord parts are connected with a connector as disclosed in Japanese Unexamined Utility Model Application Publication S58-100315 are also proposed. If the flip-up eyeglasses are, for example, eyeglasses for farsightedness including reading eyeglasses, when the flip-up eyeglasses are down, a user can something positioned away, such as scenery. In the meantime, when seeing something closer, such as reading newspaper or books, the user can easily see by flipping the lenses up. Further, when the flip-up eyeglasses are sunglasses, they can be used as sunglasses when the eyeglasses are down; in the meantime, when a user enters a dark place, such as when entering a tunnel when driving a car, he/she can secure the field of vision with the naked eye by flipping the eyeglasses up, and safety driving can be secured.

In such clip-on eyeglasses and flip-up eyeglasses, as one mode of configuration to mount lenses to right and left connecting pieces of the lens connecting member, in addition to the eyeglasses where lenses are filled into right and left rims, simple mounting structures where lenses are secured to the connecting pieces using rivets or screws, for example, as shown in FIG. 2 of Patent Literature 1, FIG. 1 of Patent Literature 2, FIG. 6 of Patent Literature 3, FIG. 2 of Patent Literature 4, FIG. 3 of Patent Literature 5 and FIG. 1 of Patent Literature 6 are also provided.

Needless to say, in clip-on eyeglasses and flip-up eyeglasses where lenses are fitted into the rims, and even with simple clip-on eyeglasses and flip-up eyeglasses, because the lenses are secured to a mounting piece by riveting or a lapped flat seam, lens exchange was not originally included in the design. In addition, after riveting and a lapped flat seam, because the lenses cannot be cut due to these members, the lens shape is determined first and cut, and after the riveting and lapped flat seam are applied, it is necessary to supply eyeglasses to the retail stores in the finished state. However, actual customers desire different lens shape or eyeglasses with a prescription; therefore, the desire of the customers cannot be satisfied on the spot.

Further, different eyeglasses may be appropriately used for different purposes. For example, it is preferable to use light-shielding sunglasses, especially sunglasses with polarizing lenses in the case of outdoor activities, such as fishing, golf, winter sports or driving. In such a case, a user wears normal eyeglasses or sunglasses until he/she arrives at the destination, and wears sunglasses with polarizing lenses at the destination. Further, in daily life, people use different sunglasses with different colors for the purpose of fashion.

However, since conventional eyeglasses do not change lenses at a store before purchase as described above and exchange is not expected by replacement of the lenses even after purchase, the store cannot respond to a customer's need and it is uneconomical to have a plurality of eyeglasses for use.

BRIEF SUMMARY OF THE INVENTION

The present invention has been developed by taking the conventional problems into consideration, and the objective is to provide a eyeglass lens connector where eyeglasses matching the purpose of use can be economically configurable by using different eyeglasses for different purposes if there is an assortment of a plurality of types of lenses. Further, the objective is to provide eyeglasses with a simple configuration and with interchangeable lenses using the lens connector. In addition, the objective is to provide a substrate for lens formation enabling easy and accurate cut-processing in a state in which use is made of a eyeglass lens connector.

In order to solve the problems, the present invention adopts the following means:

Namely, an eyeglass lens connector (referred to simply as a lens connector hereinafter) involving the present invention is a lens connector for connection with an insertion piece of a lens-connecting member, is entirely made of plastic, and is furnished with a connector body for anchored attachment onto a lens surface. The connector body is provided with an insertion hole into which the insertion piece is detachably insertable, and, protruding on the lens-ward edge of the open end of the insertion hole, with a floor guide-part for guiding the insertion piece toward the open end. The connector body is provided with fastening pins, jutting from an attachment surface of the connector body where it anchors onto the lens surface, for insertion into a proximal end, and directed toward a distal end, of fastening holes penetrating the lens, wherein the fastening pins are formed with a retaining protrusion, for engaging with the rim area surrounding the distal end of the fastening holes in the lens, by the portion of the pins jutting out from the distal end, with the pins having been inserted into the fastening holes, being crushed.

In the lens connector, lateral guide pieces may jut out from the both margins of the opening end.

In the lens connector, the lateral guide pieces jut out from both margins of the opening end on the floor guide-part, and the inner surface facing both lateral guide pieces may be configured so as to expand a gap between guiding surfaces tilting outward from the opening end toward the opening end tip side.

In the lens connector, an engagement concave portion or an engagement hole is established in the inner surface of the insertion hole, and may be configured such that the engagement protrusion placed in the insertion piece can be engaged with the anchored attachment surface in the fitted state.

In the lens connector, an engagement hole that can be engaged with the engagement protrusion in the fitted state may be established on the engagement surface facing the anchored attachment surface in a state in which the insertion pieces are completely inserted into the insertion holes.

In the lens connector, the fastening pins may jut out at the floor guide-part.

In the lens connector, the anchored attachment surface of the anchored attachment surface to a lens may be formed to be a curved surface that makes contact with the lens surface.

The lens connector may be configured such that a groove (engagement expansion slot) that is opened at the opening end and expands toward the bottom of the insertion hole is placed in the engagement surface part facing the anchored attachment surface; an engagement protrusion placed in the insertion piece is fittable into the engagement expansion slot; and a predetermined insertion state of the insertion piece into the insertion hole can be obtained in a state in which the tip of the engagement protrusion comes into contact with the groove tip of the engagement expansion slot.

The lens connector may be configured such that an engagement concave portion is established on the groove side surface of the engagement expansion slot; the engagement protrusion placed in the engagement protrusion is engaged with the engagement concave portion in the fitted state while the tip of the engagement protrusion comes into contact with the groove tip of the engagement expansion slot.

It may be configured such that the fastening pin that juts out from the anchored attachment surface is one; the transverse section of the fastening pin is formed to be noncircular; the fastening pin is inserted into a noncircular fastening hole matched with the transverse section shape of the fastening pin placed in the lens; and a retaining protrusion that is engaged with the periphery of the other end of the fastening hole is formed by crushing the protrusion that protrudes from the other end of the fastening hole.

The eyeglasses with interchangeable lenses (hereafter, referred to as eyeglasses) relating to the present invention are equipped with a lens connecting member where right and left insertion pieces horizontally protruding in the reverse direction are placed and lenses with a connector where the lens connector is secured to the lenses. The eyeglass lens connector are secured to the edge on the lens surface by making the hole center of the insertion holes in the horizontal state. Concurrently, the insertion pieces are detachably inserted into the insertion holes. Then, it is characterized such that the fastening pins jotting out from the anchored attachment surface are inserted into the fastening holes penetrating through the upper edge portions from one end to the other end, and the retaining protrusion engaged with the periphery of the other end is formed by crushing the protrusion protruding at the other end.

The eyeglasses are equipped with a lens connecting member where right and left insertion pieces protruding downward are placed, and lenses with a connector where the eyeglass lens connector are secured to the lenses, and the eyeglass lens connector is secured to the edge portion inside the lens surface (closer to the nose) by vertically adjusting the hole center of the insertion hole. Concurrently, the insertion pieces are detachably inserted into the insertion holes. Further, it may be configured such that the fastening pins jotting out from the anchored attachment surface are inserted into the fastening holes penetrating through the edge portions inside (closer to the nose) from one end toward the other end, and a retaining protrusion to be engaged with the periphery of the other end is formed by crushing the protrusion protruding at the other end.

The lens forming substrate relating to the present invention is characterized such that the eyeglass lens connector are secured to a plastic lens forming plate that can form a lens with the required shape by cut processing.

The present invention works successfully as described below.

(1) Since the lens connector relating to the present invention is entirely made of plastic and is equipped with fastening pins, insertion of the fastening pins into fastening holes established in the lenses and crushing the projected portions enables easy and certain securement to the lenses.

Since the lens connector has insertions holes where insertion pieces of the lens connecting member can be detachably inserted, the lenses are interchangeable. Hence, eyeglasses matched with an intended use are economically configurable.

Further, since a floor guide-part of the lens connector juts out, the insertion pieces can be inserted into the insertion holes without scratching the lenses naturally by using the guiding effect of the floor guide-part.

(2) Further, since the eyeglasses relating to the present invention are equipped with lenses with a connector where the lens connector is secured to the lenses via fastening pins, mounting the lenses with a connector to the insertion pieces of the lens connecting members to be detachable, a clip-on environment with interchangeable lenses (both flip-up and non-flip-up) and the flip-up eyeglasses can be easily configured.

Therefore, according to the present invention, while the eyeglasses matched with an intended use are used with the lens connector as is, the eyeglasses can be easily configured merely by exchanging the lenses, which is economical compared to the case of having an assortment of many eyeglasses.

(3) In the lens forming substrate relating to the present invention, the lens connector is connected to a plastic lens forming plate enabling the formation of lenses of the required shape by cut processing. Therefore, according to the lens forming substrate, after a required lens outline is marked to a lens forming plate in a state in which the lens forming plate is connected to the insertion pieces of the lens connecting member via the lens connector, detachment of the lens forming substrate from the insertion piece enables easy and accurate cutting of the lens forming plate to a desired lens shape, and unique eyeglasses can be configured.

(4) While an engagement concave portion or an engagement hole is established in the inner surface of the insertion hole, when an engagement protrusion that can be engaged with the engagement concave portion or the engagement hole is established in the insertion piece, complete insertion of the insertion piece into the insertion hole can be confirmed. Concurrently, certain retention of the insertion piece can be attempted.

(5) When lateral guide pieces jut out from both margins of the opening end, the end of the insertion piece can be more smoothly guided toward the opening end of the insertion hole by the guiding effect of both lateral guide pieces without generating shear. In this case, when an inner surface facing both lateral guide pieces is regarded as a guiding surface tilting outward from the opening end toward the opening end tip side and a gap between both guiding surfaces is expanded toward the opening end tip side, the gap between the edges of both lateral guide pieces can be further expanded. Therefore, the tips of the insertion pieces can be inserted into the expanded gaps between the tips, and the insertion pieces can be smoothly guided.

(6) When the fastening pins jut out by the floor guide-parts, the floor guide-parts can be secured to the lens surface in a safer secured state.

(7) When the anchored attachment surface of the anchored attachment surface portion to the lens is formed to be a curvature that can make contact with the surface of the lens, the stability of the securing state of the lens connector to the lens can be improved.

DETAILED DESCRIPTION OF THE INVENTION

Embodiment 1

Figure 1:
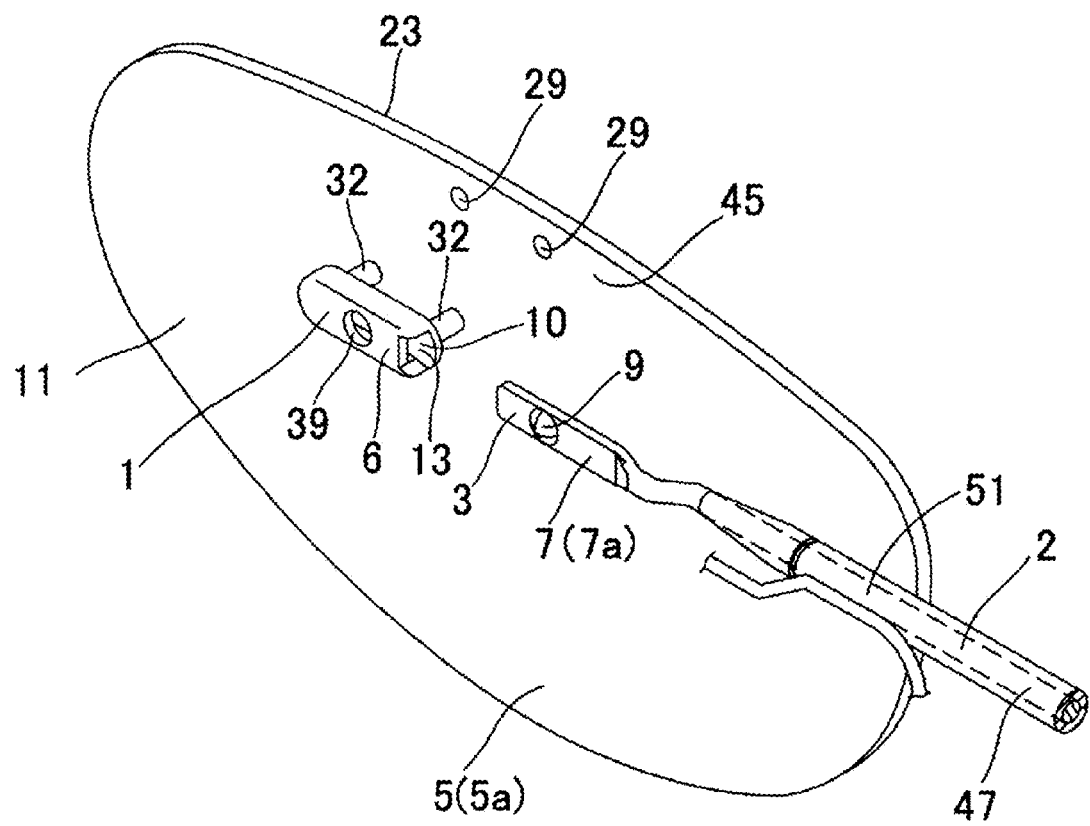
FIG. 1 is an exploded perspective view showing the lens connector relating to the present invention.
Figure 2A:
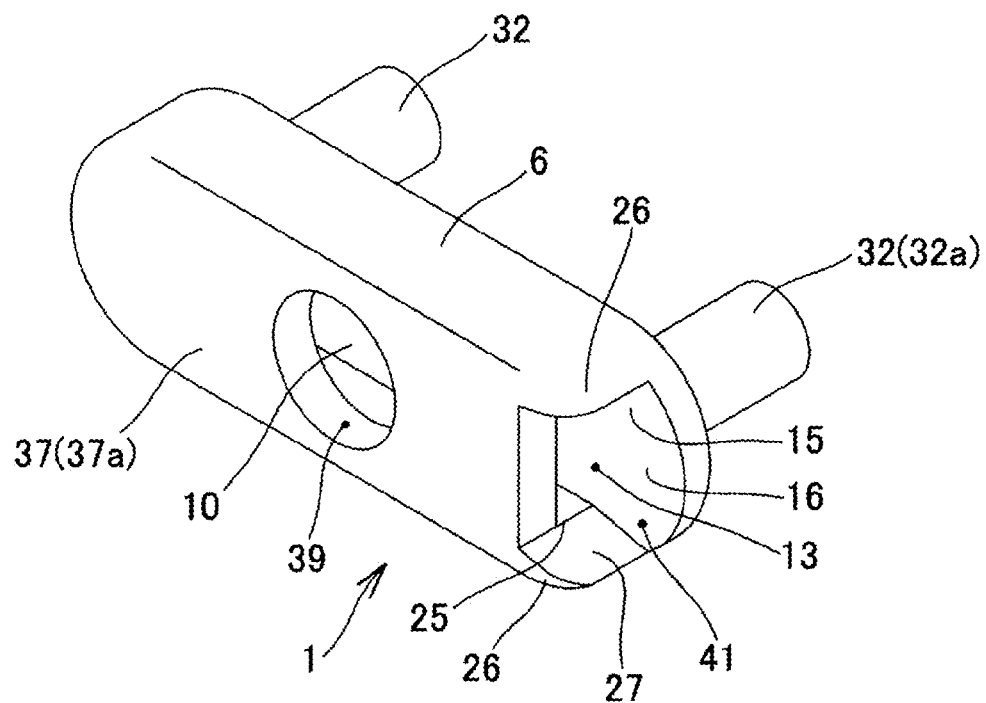
FIGS. 2A and 2B are perspective views showing the lens connector.
Figure 2B:
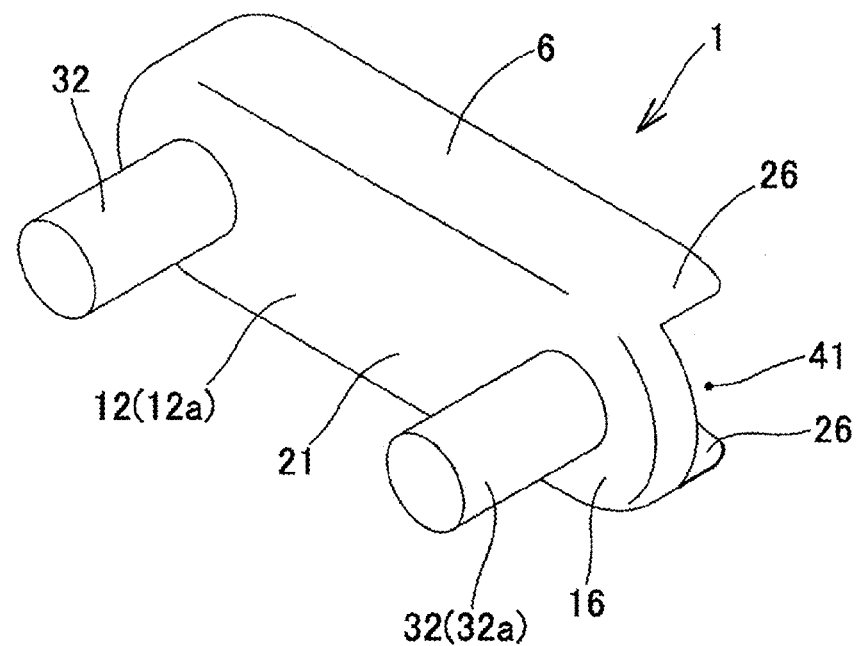

In FIGS. 1 to 3, a lens connector 1 relating to the present invention is to be connected to insertion pieces 3 of a lens connecting member 2, and is entirely made of plastic and equipped with a connector body 6 secure to lenses 5. The insertion pieces 3 are, for example, rectangular-plate-state, and a spherical engagement protrusion 9 juts our in the center of a surface 7.

The lens connector 1 can be formed using plastic, such as polyacetal, nylon, polycarbonate or ABS resin.

In the lens connector 1, as shown in FIGS. 1 to 4, insertion holes 10 whose bottom 17 is closed where the insertion pieces 3 can be detachably inserted are placed, respectively, and are concurrently secured to the lens 5 by a anchored attachment surface 12 facing the surface of the lens (inner surface 11 or outer surface 23). Then, a floor guide-part 16 juts out from an edge 15 at the lens side of the opening end 13 of the insertion hole 10.

Specifically explaining a connector body 6 with reference to FIGS. 1 to 4, a comparatively long and flat rectangular box is exhibited in the insertion direction of the insertion pieces 3, and the insertion hole 10 whose bottom 17 (FIG. 3B) for inserting the insertion pieces 3 to be detachable is closed, one end of which is opened and formed to be lengthwise in the axis line direction of the connector body 6. The insertion hole 10 has a rectangular-shaped cross sectional mode.

Then, the guide pieces 16 that guide the tip 20 (FIG. 4C) of the insertion pieces 3 toward the opening end 13 jut out in the successive connected state, and the anchored attachment surface 21 at the lens side and an insertion surface 22 facing the anchored attachment surface 21 in the anchored attachment surface 12 form a successive connecting flat surface without any step. The connector body 6 is secured to the surface (11 or 23) of the lens 5 by the anchored attachment surface 21. FIGS. 1 and 4C show the state to be secured to the inner surface 11 of the lens 5.

Figure 3A:
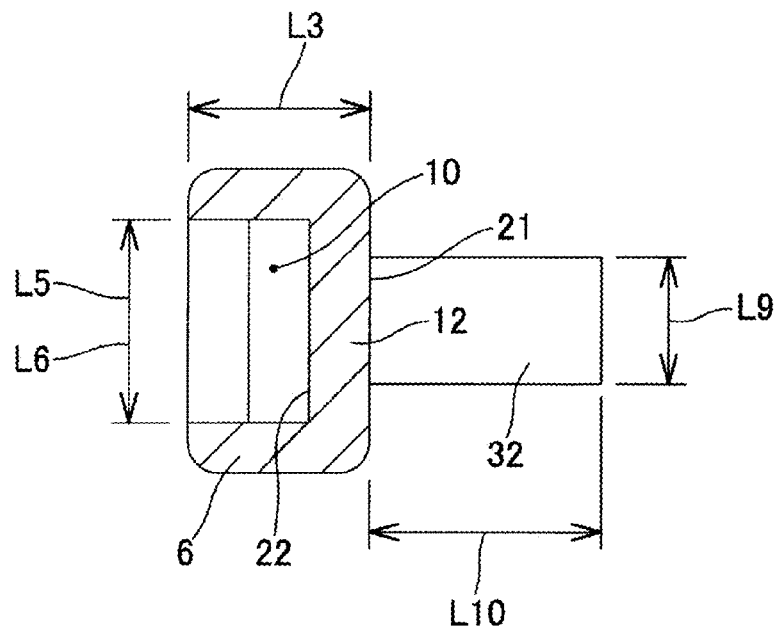
FIGS. 3A and 3B are cross sectional views of the lens connector.
Figure 3B:
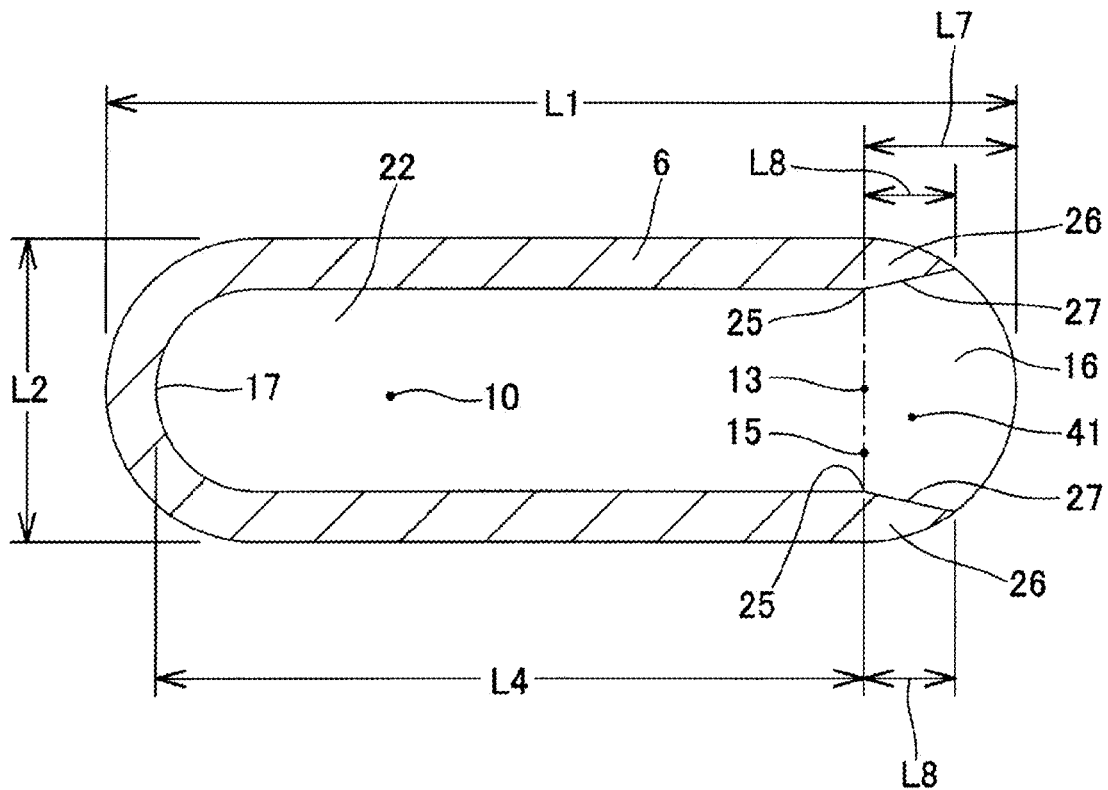

In this embodiment, as shown in FIGS. 2 and 3B, the lateral guide piece 26 juts out from the facing margin 25 of the opening end 13 on the floor guide-part 16. The inner surfaces of the both lateral guide pieces 26, as shown in FIG. 3B, are guiding surfaces 27 which tilt outward from the opening end 13 toward the open end edge side, and a gap between both guiding surfaces 27 and 27 expands toward the opening end tip side.

Further, two fastening pins 32 are positioned at both sides of the anchored attachment surface 21 of the connector body 6 in the lengthwise direction, and jut out from two fastening holes 29 (FIG. 1 and FIG. 4A) placed in the lens 5 at a small gap so as to penetrate from one end 30 toward the other end 31. In this embodiment, since a fastening pin 32a at the opening end 13 side juts out from the anchored attachment surface 21 in state whose portion exists in the floor guide-part 16, as shown in FIG. 4C, the floor guide-part 16 is stably secured to the lens 5.

Figure 4A:
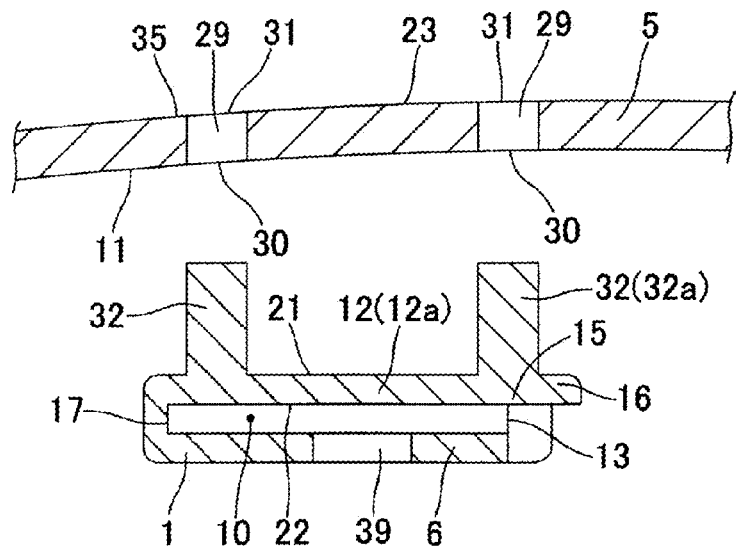
FIGS. 4A through 4C are cross sectional views for explaining a process to secure the lens connector to a lens.
Figure 4B:
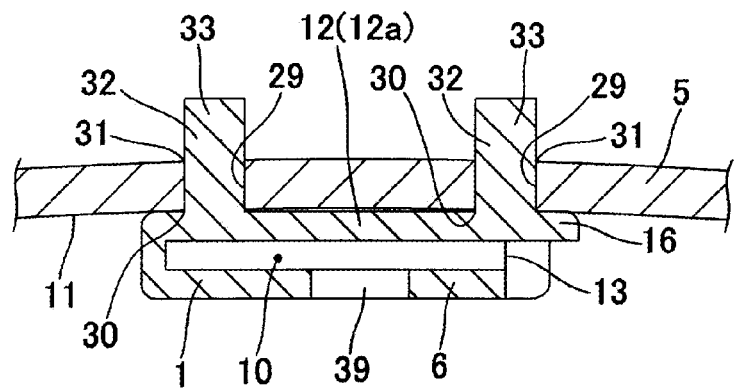
Figure 4C:
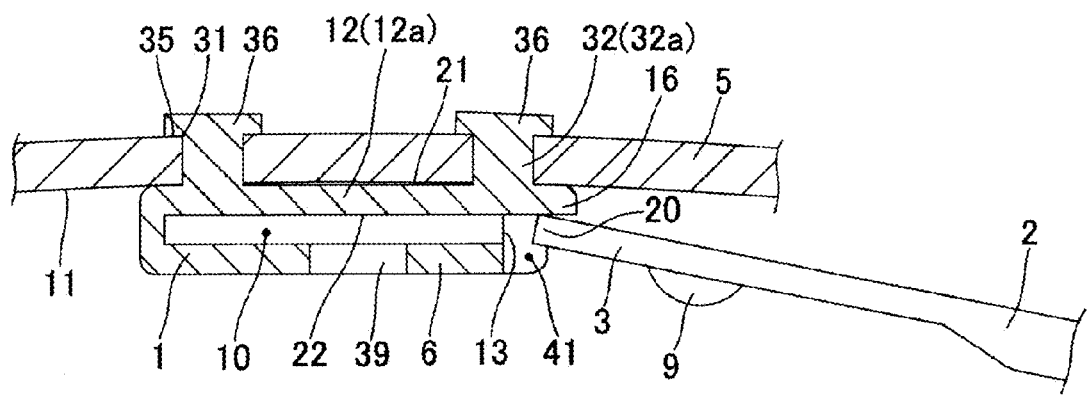

While the fastening pins 32, as shown in FIG. 4B, are inserted into the fastening holes 29 from one end 30, a protrusion 33 that protrudes at the other end 31 of the fastening holes 29 is crushed. Whether the protrusion 33 is heated and crushed or is mechanically crushed using a deformation property of plastic without heating does not a matter. As shown in FIG. 4C, a retaining protrusion 36 engages with the periphery 35 of the other end 31 by crushing as described above. As shown in FIGS. 4C and 6C, the lens connector 1 is baffled by such swage and is secured to the lens 5.

Further, as shown in FIGS. 2A and 6C, an engagement hole 39 is established that is engaged with an engagement surface 37 facing the anchored attachment surface 12 of the connector body 6 in the state of fitting into the engagement protrusion 9 while the insertion pieces 3 are completely inserted into the insertion holes 10. In this embodiment, the engagement hole 39 is placed in the center portion of the engagement surface 37 in the lengthwise direction.

Illustrating the dimension of the main components of the lens connector 1 having such configuration, as shown in FIGS. 3A and B, the length L1, the width L2 and the thickness L3 of the connector body 6 in the direction of axis are set at 9 mm, 3 mm and 1.8 mm, respectively. Concurrently, the length L4 of the insertion hole 10 is set at 7 mm, and the hole width L5 is set to be substantially equal to the width of the insertion pieces 3. Further, the diameter L6 of the engagement hole 39, the protruding length L7 from the opening end 13 of the floor guide-part 16, and the protruding length L8 from the opening end 13 of the lateral guide piece 26 are set at 2 mm, 1.5 mm and 0.9 mm, respectively. Further, the diameter L9 of the fastening pin 32 is sect at 1.25 mm, and the protruding length 10 of the fastening pin 32 is set to be comparatively longer so as to correspond to different length thickness, for example, at 2.6 mm. Further, the center distance of both fastening pins 32 and 32 is set at 6 mm.

Figure 5A:
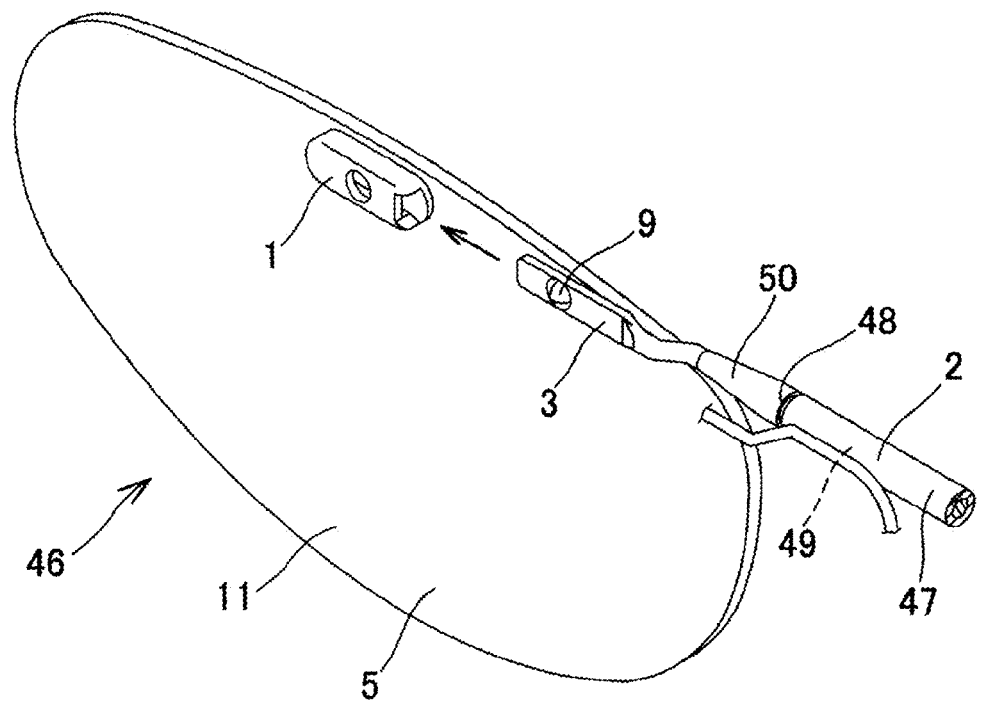
FIGS. 5A and 5B are perspective views showing a process to mount a lens with a connector onto the lens connecting member.
Figure 5B:
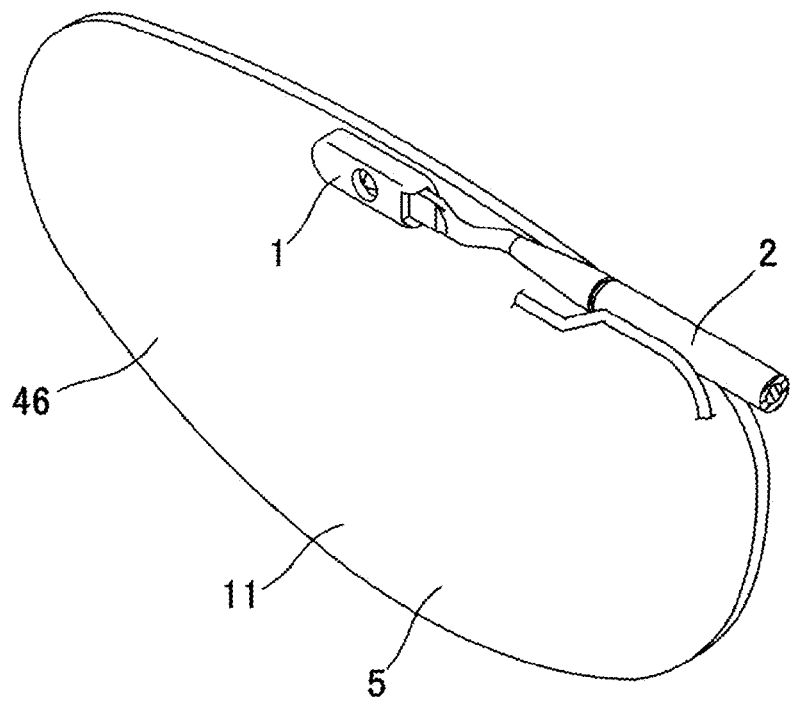
Figure 6A:
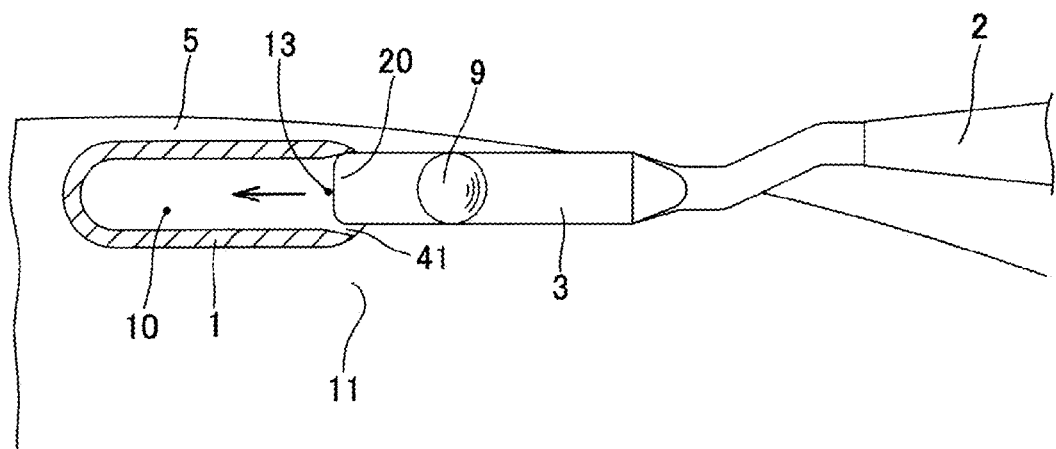
FIGS. 6A through 6C are a cross sectional views for explaining a process to insert an insertion pieces of the lens connecting member into an insertion hole of the lens connector secured to the lens.

Then, the tip 20 of the insertion pieces 3, as shown in FIGS. 4C and 6A, is inserted into a guide groove 41 (FIG. 2) formed by the floor guide-part 16 and the both lateral guide pieces 26, the tip 20 is smoothly guided toward the opening end 13 of the insertion hole 10. If the insertion pieces 3 is squeezed toward the insertion hole in the guided state, since the insertion surface 22 is formed to be a successive flat surface without any step, as shown in FIG. 5B, the insertion pieces 3 is inserted into the insertion hole 10 naturally without damaging the surface (11) of the lens 5. In association with this insertion, the engagement surface part 37 is pressed by the engagement protrusion 9 and elastically deformed. Finally, as shown in FIG. 6C, the lens with a connector 46 as shown in FIG. 5B is configured by fitting the engagement protrusion 9 into the engagement hole 39.

Then, the insertion hole 10, as shown in FIG. 3B, has a configuration whose bottom 17 is closed and one end is opened, in other than that of a through-hole. If formed as a through-hole, a case where the end portion of the insertion pieces 3 is in the protruded state from the end portion of the through-hole may occur, and a case where the mounting position of the lens to the lens connecting member 2 is difficult to be accurately determined may occur. If the insertion pieces 3 are completely inserted into the insertion holes 10 as shown in FIG. 5C, the mounting position of the lens 5 to the lens connecting member 2 can be accurately determined. In addition, any incident where the protrusion damages the lens or a user may be injured by the protrusion can be avoided.

Furthermore, in order to make the lens connector 1 unnoticeable in the state to be secured to the lens 5, a lens connector colored to the similar colors may be used. For example, the connector may be colored brown or gray.

Embodiment 2

FIGS. 7 to 9, 12 and 18 show an embodiment of eyeglasses with interchangeable lenses 42 configured by using the lens connector 1 having such configuration (hereafter, referred to as eyeglasses), and hereafter, first eyeglasses 42a, second eyeglasses 42b, third eyeglasses 42c and fourth eyeglasses 42d are explained.

Configuration of First Eyeglasses

Figure 7:
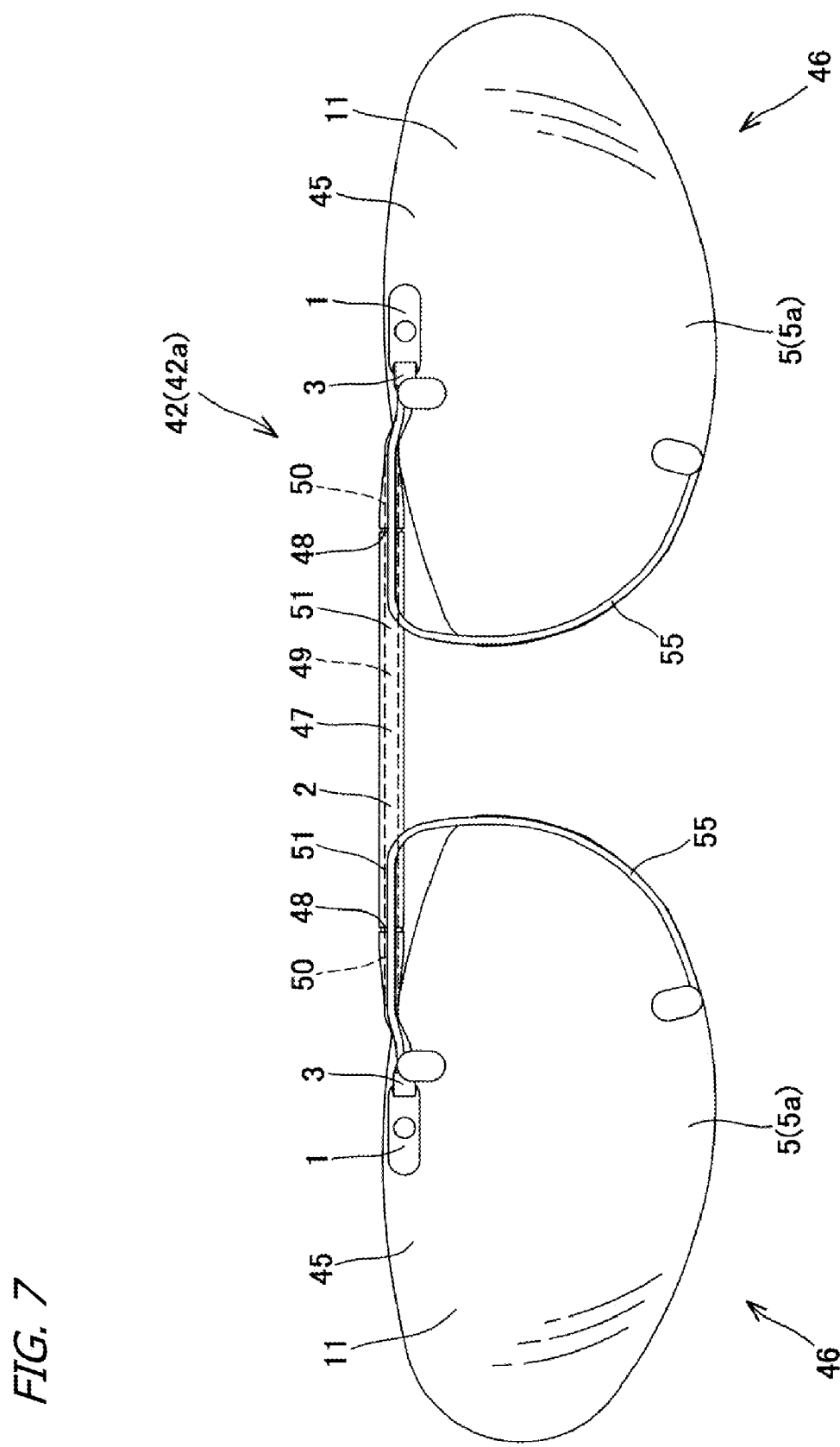
FIG. 7 is a front view showing flip-up type clip-on eyeglasses formed by connecting lenses to right and left insertion pieces of the lens connecting member.
Figure 8:
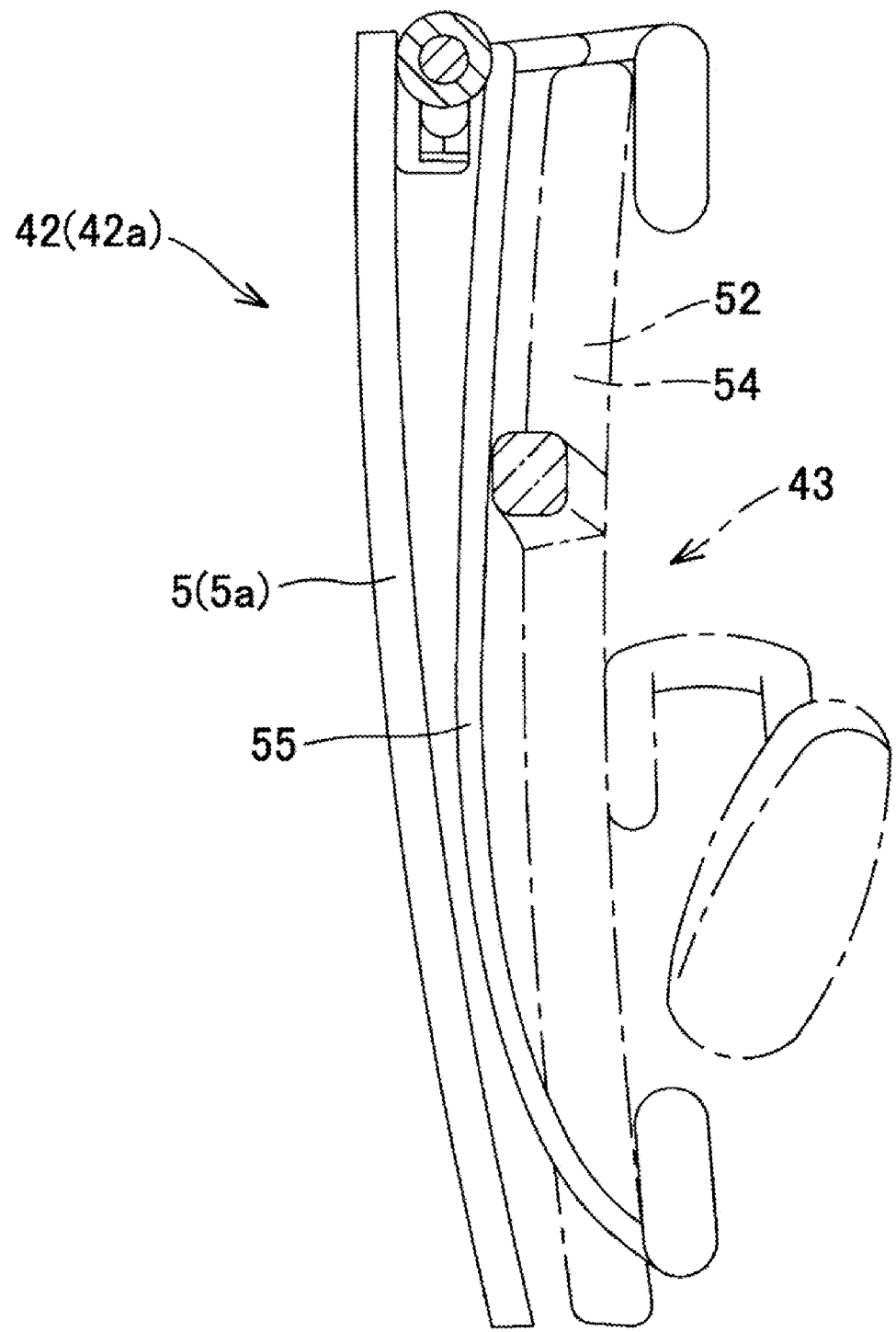
FIG. 8 is a side view showing the state where the clip-on eyeglasses are mounted to body eyeglasses to a state where attachment lenses are down.
Figure 9:
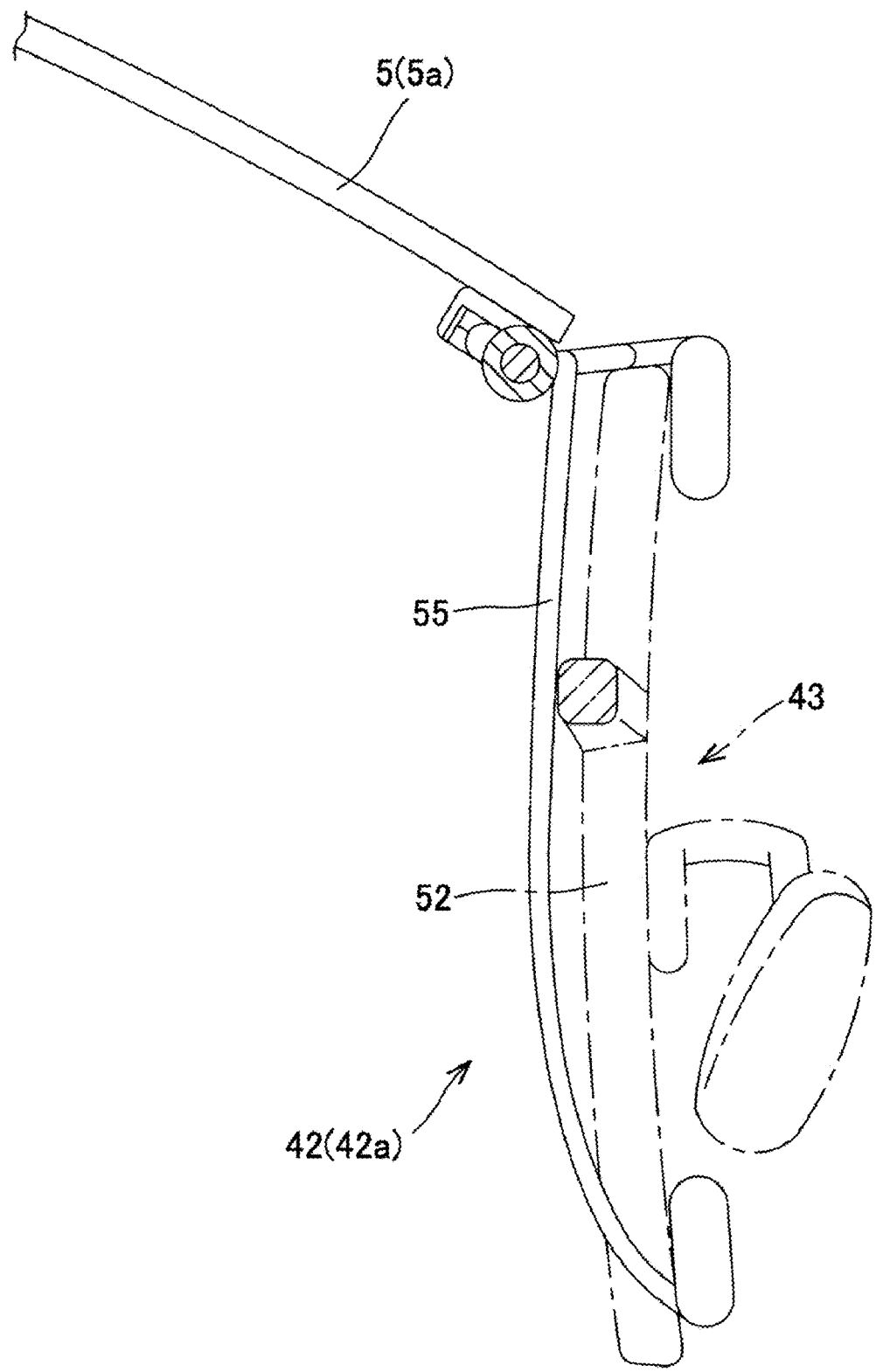
FIG. 9 is a side view showing a state where the attachment lenses are flipped up.
Figure 10:
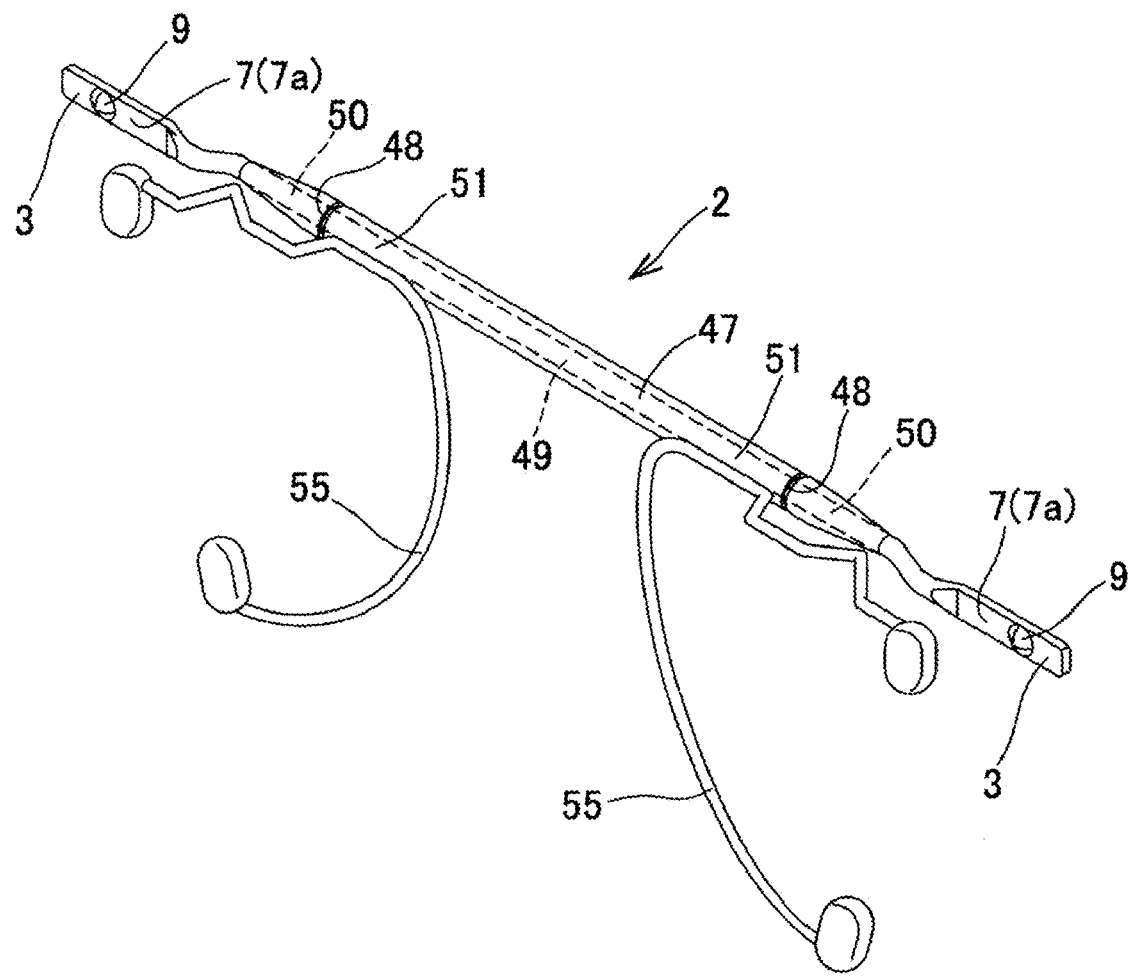
FIG. 10 is a perspective view showing the lens connecting member.
Figure 11:
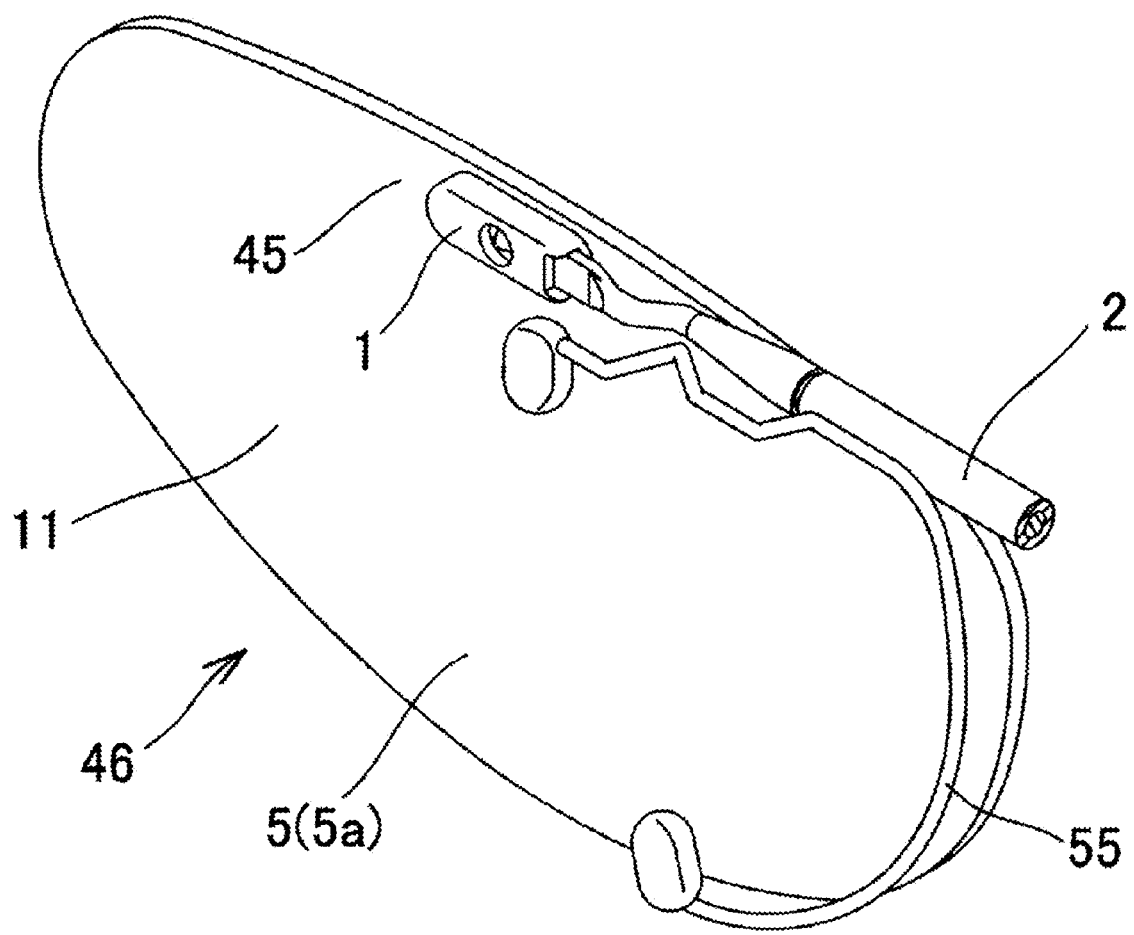
FIG. 11 is a perspective view showing a state where the lenses with a connector are mounted into the insertion pieces of the lens connecting member.

The first eyeglasses 42a shown in FIGS. 7 to 9 are flip-up type clip-on eyeglasses to be detachably mounted to the body eyeglasses 43, and as shown in FIGS. 7 and 10 to 11, are equipped with the lens connecting member 2 formed by establishing both insertion pieces inversely protruding in the horizontal direction and a lens with a connector where the lens connector 1 is secured to the edge portion 45 on the inner surface of attachment lens 5a. The attachment lens 5a is formed as a light-shielding polarized plastic lens.

The lens connecting member 2 is made of metal in this embodiment, and as shown in FIGS. 7 and 10, a rotary axle 49 is inserted into a tubular support shaft 47 extending in the horizontal direction, and the rotary axle 49 can be turned around the axis line in forward and reverse directions, and both ends 50 of the rotary axle 49 protrude from the both ends 48 of the tubular support shaft 47, and the both tip side parts have required width in the vertical direction and are formed as the insertion piece 3 having the long rectangular-plate in the horizontal direction. As shown in FIG. 1, a spherical engagement protrusion 9 juts out from the center of the inner surface (surface at the face side) of the insertion piece 3. Further, curved elastic lens clips 55 placed along the inner edge portion of both the body lenses 52 of the body eyeglasses 54 are provided on both end portions 51 of the tubular support shaft 47.

Further, when configuring the lens with a connector 46, first, as shown in FIG. 1, the two right and left fastening holes 29 penetrate through in association with the arrangement of the two fastening pins 32 in the edge portion 45 of the attachment lens 5a. Then, when securing the lens connector 1 to the edge portion 45 of the inner surface 11 of the attachment lens 5a, as shown in FIG. 4B, the center of the insertion hole 10 is adjusted to be in the horizontal state and the fastening pins 32 are inserted into the fastening hole 29 from one end 30 to the other end 31. While the fastening pins 32 are inserted into the fastening holes 29 as shown in FIG. 4B, the protrusion 33 protruding at the other end 31 is crushed as shown in FIG. 4C. The protrusion 33 may be welded, or may be compressed without heating. The retaining protrusion 36 is formed to engage with the periphery 35 of the other end 31. As shown in FIGS. 6C and 11, a lens with a connector 46 where the lens connector 1 is secured to the edge portion 45 on the inner surface 11 of the attachment lens 5a is configured by such swage.

As explained in Embodiment 2, both attachment lenses 5a are mounted to the lens connecting member 2 by inserting the tips 20 of the insertion pieces 3 into the connector, and the flip-up type clip-on eyeglasses 42a are configured.

FIG. 8 shows a state where the flip-up type clip-on eyeglasses 42a are mounted on the body eyeglasses 53 by engaging the curved elastic lens clips 55 with the inner edge portions 54 of the both body lenses 52 of the body eyeglasses 43. FIG. 8 shows a state where the right and left attachment lenses 5a are turned downward and are down. The down state is stably maintained by the engagement in conjunction with a spring action. In this state, the right and left attachment lenses 5a cover the front surface of the right and left body lenses 52 of the body eyeglasses 43. For example, in the case of outdoor activity, such as fishing, golf, winter sports or driving, the state where the attachment lenses 5a are down enables the configuration of sunglasses with polarized lenses. Further, FIG. 9 shows the state where both attachment lenses 5a are flipped up. The flipped-up state is stably maintained by the engagement in conjunction with the spring action. For example, when a user stays inside where sunglasses are not required or a driver enters into a tunnel while driving a car, the user/driver can secure the field of vision by the body eyeglasses 43 by flipping up the lenses, securing driving safety.

Further, since the insertion pieces 3 can be inserted into the insertion holes 10 to be detachable, lenses with a connector 46 can be detached from the lens connecting member 2. In such case, while the lens connecting member 2 is used as is, the lenses with a connector 46 using lenses with different functions are selected for a required purpose and eyeglasses matched with an intended use can be configured by mounting the lenses to the lens connecting member 2. For example, if two types of lenses, first lenses with a connector using a normal light-shielding light-colored lenses and second lenses with a connector using polarized light-shielding dark-colored lenses, are prepared, when performing outdoor activity, such as fishing, golf, winter sports or driving, a user wears sunglasses configured by mounting the first lenses with a connector to the lens connecting member 2, and can be fashionable until reaching the destination. After arriving at the destination, the first lenses with a connector are detached from the lens connecting member 2 and the sunglasses with polarized lenses are configured by mounting the second lenses with a connector instead, and the user can wear the sunglasses for activity. In daily life, if different light-shielding light-colored lenses are used for different purposes, the user can be fashionable. Further, even if the lenses are scratched, exchange is easy.

Configuration of Second Eyeglasses

Figure 12:
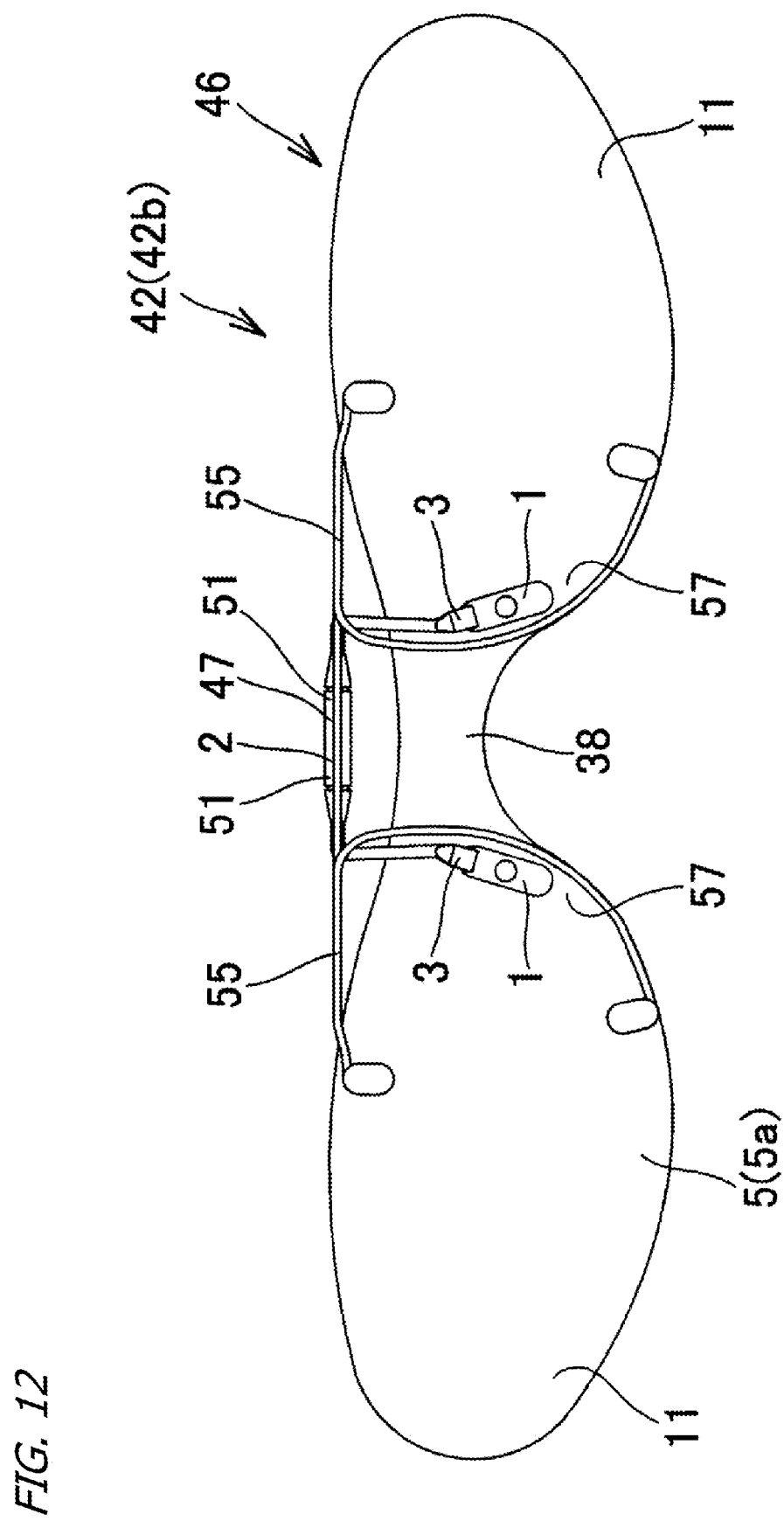
FIG. 12 is a front view showing clip-on eyeglasses where lenses formed by successively connecting both attachment lenses.

The second eyeglasses 42b shown in FIG. 12 relate to another embodiment of the flip-up type clip-on eyeglasses detachably mounted on the body eyeglasses 43, and are equipped with the lens connecting member 2 where the right and left insertion pieces 3 protruding downward (protruding obliquely downward in this embodiment) are placed and the lenses with a connector 46 where the lens connector 1 is secured to the edge portion 57 inside the inner surface 11 of the attachment lens 5a (at the side closer to the nose) by adjusting the hole center of the insertion holes 10 vertical (in obliquely vertical direction in this embodiment). The attachment lenses 5a are a unitary piece where right and left attachment lenses are continuously joined by a bridge portion 38, and for example, constructed as a plastic polarized lens.

Figure 13:
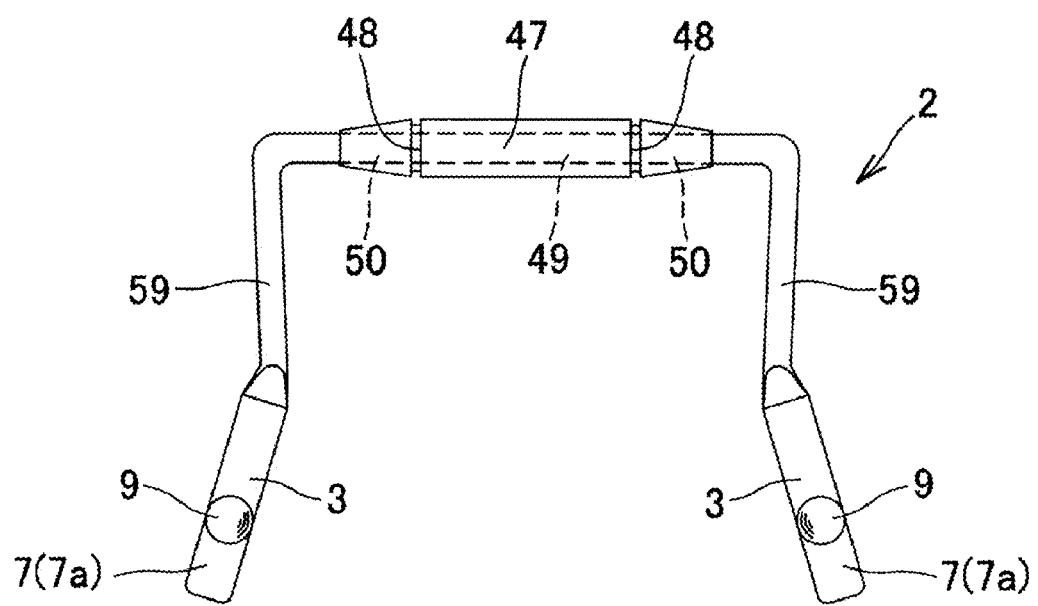
FIG. 13 is a front view showing the lens connecting member.
Figure 14:
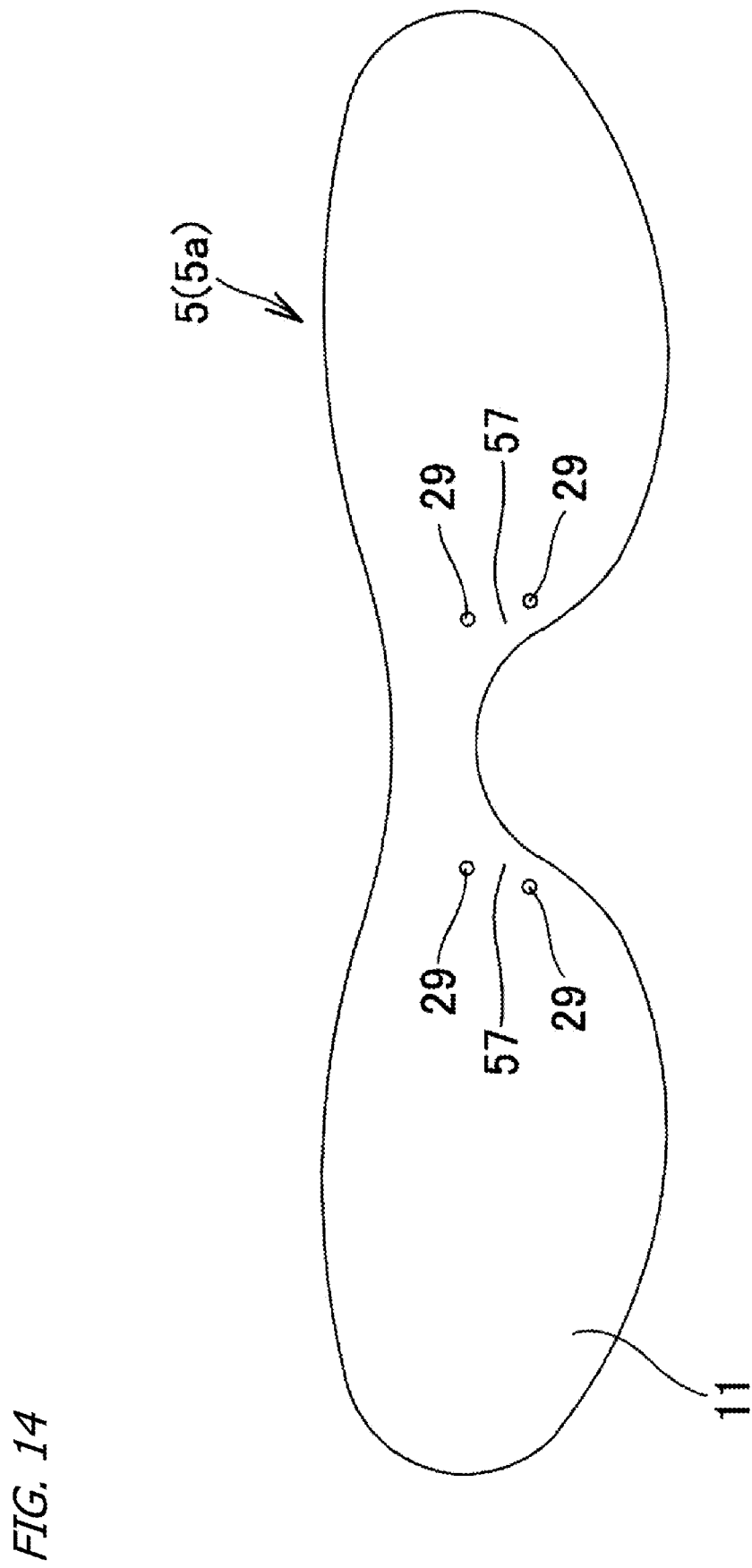
FIG. 14 is a front view showing the lens.
Figure 15:
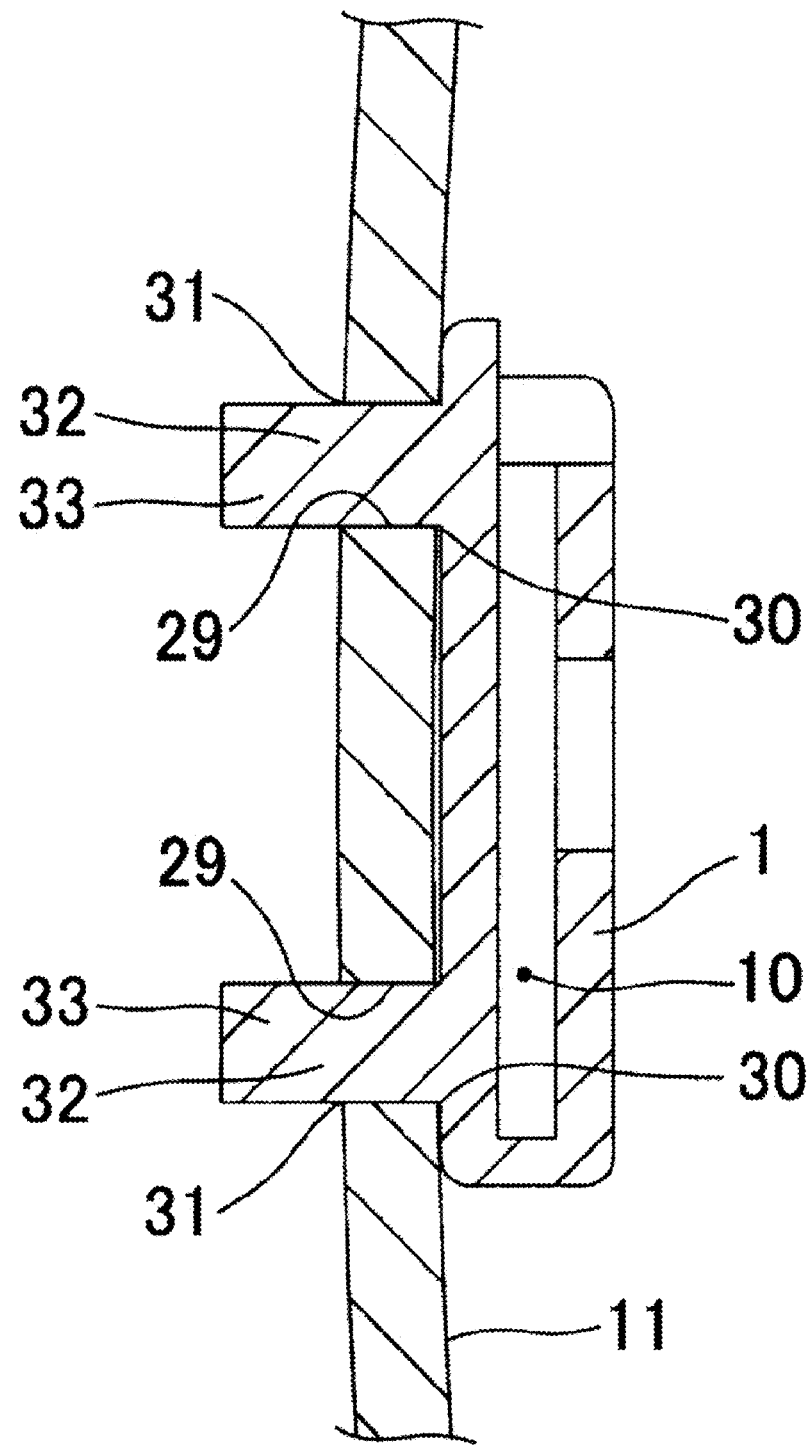
FIG. 15 is a cross sectional view for explaining a process to secure the lens connector to the lenses.

The lens connecting member 2 is made of metal in this embodiment, and as shown in FIG. 13, the rotary axle 49 is inserted into the horizontally-extending tubular support shaft 47, and the rotary axle 49 can be turned around the axis line in the forward and reverse directions. Both ends portions 50 of the rotary axle 49 are composed of right and left arms 59 that protrude from both ends 48 of the tubular support shaft 47 and extend downward, and that can be elastically deformed, and the insertion pieces 3 that are connected at the lower ends of the right and left arms 59 and extend obliquely downward, and that have a slim rectangular plate. The engagement protrusion 9 and the curved elastic lens clips 55 are similar to those of the first eyeglasses as shown in FIG. 12, and the lens with a connector 46 where the lens connector 1 is secured in the edge portion 57 inside the inner surface 11 of the attachment lens is configured as shown in FIG. 17.

Figure 6B:
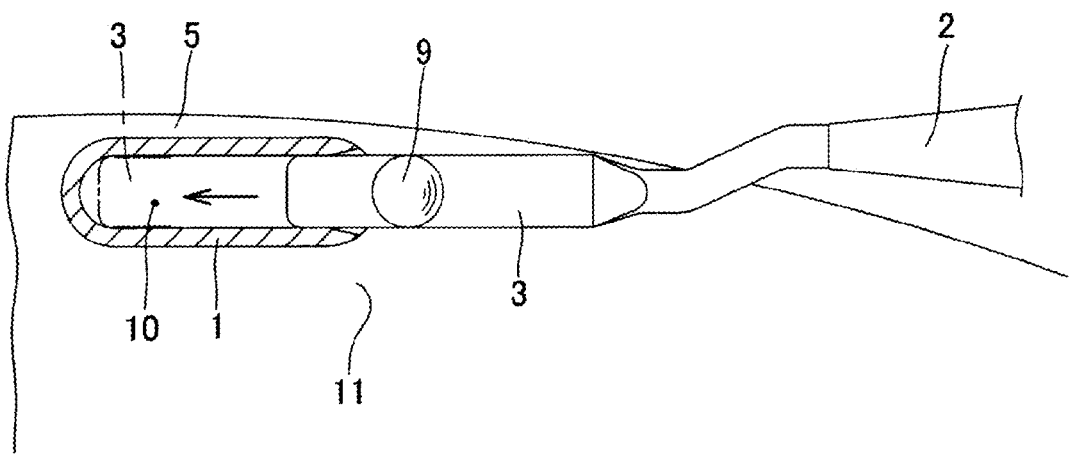
Figure 6C:
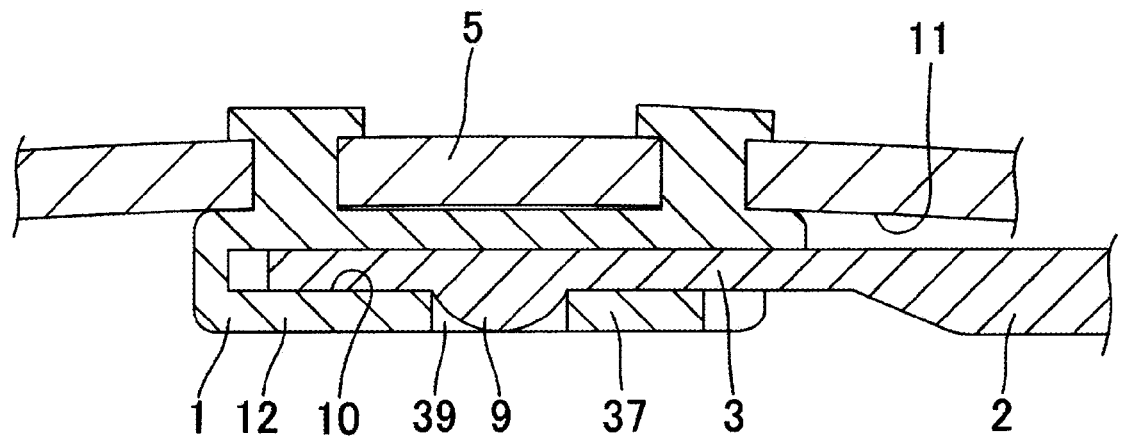
Figure 16:
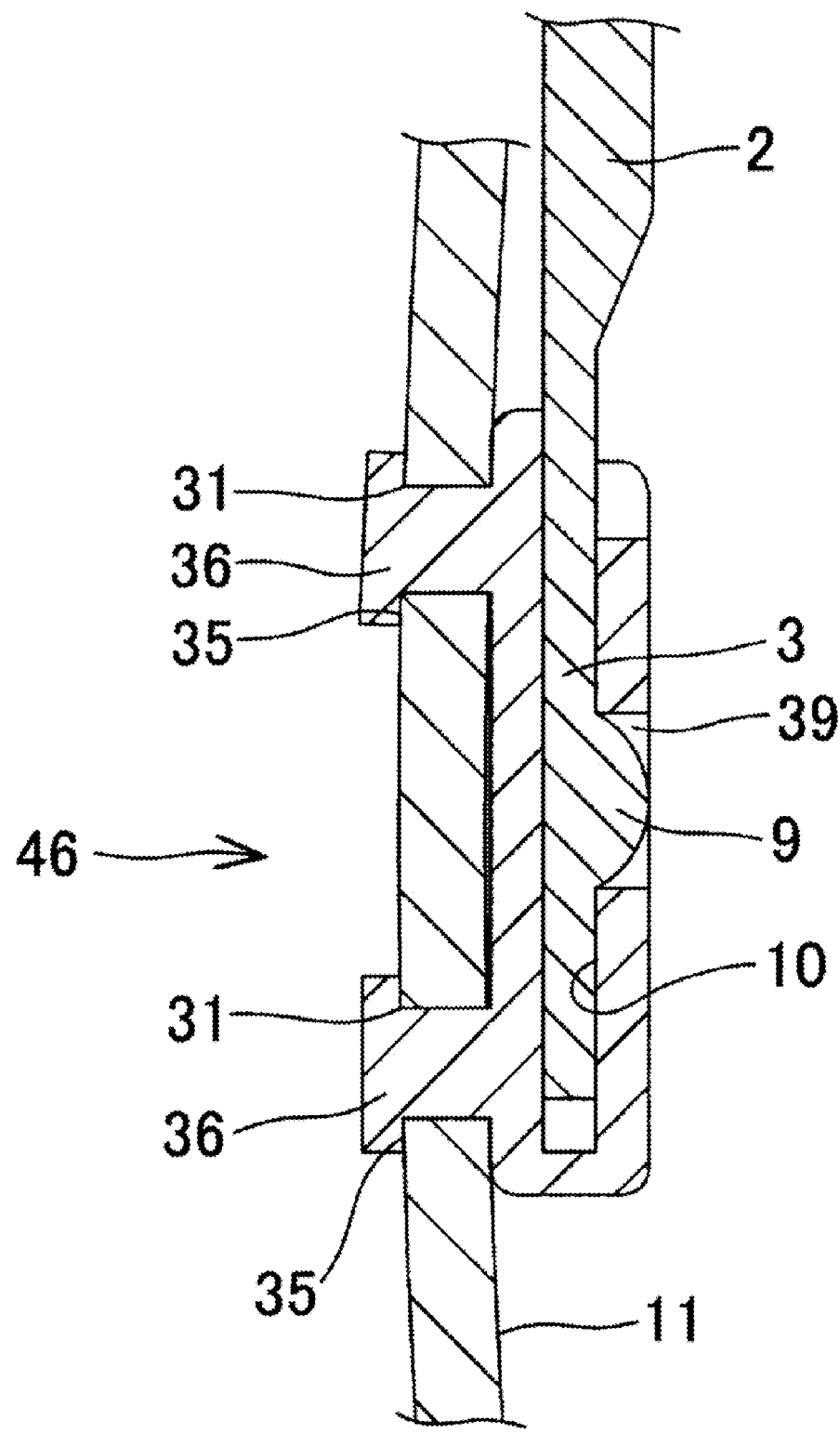
FIG. 16 is a cross sectional view showing a state where the lens connector is secured to the lenses.
Figure 17:
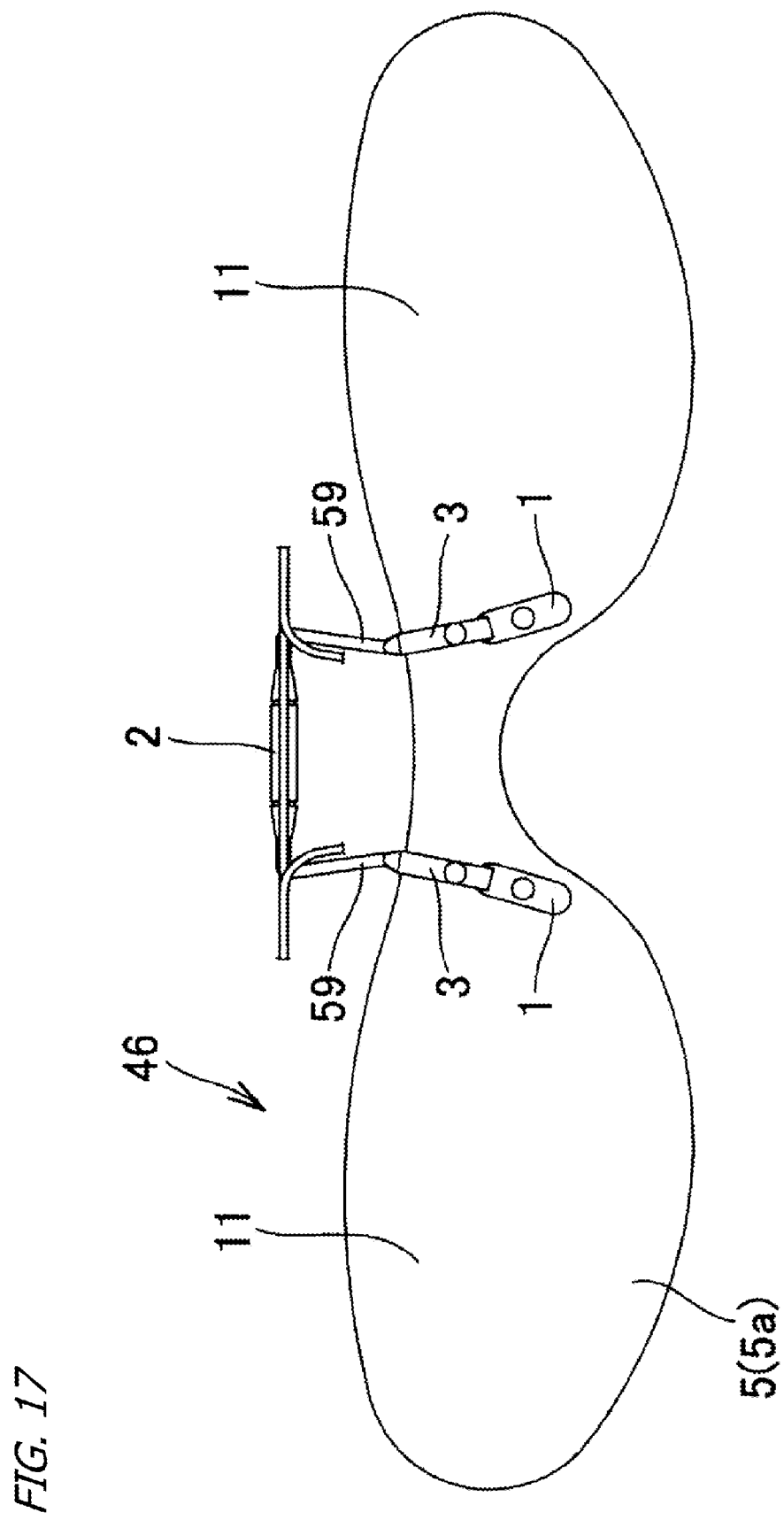
FIG. 17 is a front view for explaining a process to mount the lenses formed by successively connecting both attachment lenses to the lens connecting member.

Then, when mounting a lens with a connector 46 having such configuration to the right and left insertion pieces 3 and 3 of the lens connecting member 2, the insertion means 3, as shown in FIGS. 6B and C and FIG. 17, are inserted into the insertion holes 10 naturally by being smoothly guided by the guide groove 41 in association of required elastic deformation of the arms 59. In association with this insertion, the engagement surface 37 is pressed by the engagement protrusion 9 and elastically deformed, and at last, the engagement protrusion 9 is fitted into the engagement hole 39. Such fitted state is a state where the insertion pieces 3 are completely inserted into the insertion holes 10 in FIG. 16.

The flip-up type clip-on eyeglasses 42b shown in FIG. 12 where completely fitting the insertion pieces 3 into the insertion holes 10 can be confirmed. Concurrently, the engagement of the engagement protrusions part 9 into the engagement hole 39 can certainly retain the insertion pieces 3, and the right and left attachment lenses 5a are mounted to the lens connecting member 2 is configured.

The clip-on eyeglasses 42b having such configuration, as similar to FIGS. 8 and 9, is mounted to the body eyeglasses 43 by engagement of the curved elastic lens clips 55 to the inner edge portion 54 of the right and left body lenses 52 of the body eyeglasses 43, and a state where the attachment lenses 5a are turned downward and are down and another state where the attachment lens 5a is flipped up are obtained.

Further, similarly, selection of the lenses with a connector using lenses with different functions as needed and mounting the lenses to the lens connecting member 2 enable to a configuration of eyeglasses matched with an intended purpose as similar to the explanation of the first eyeglasses 42a.

Configuration of Third Eyeglasses

Figure 18:
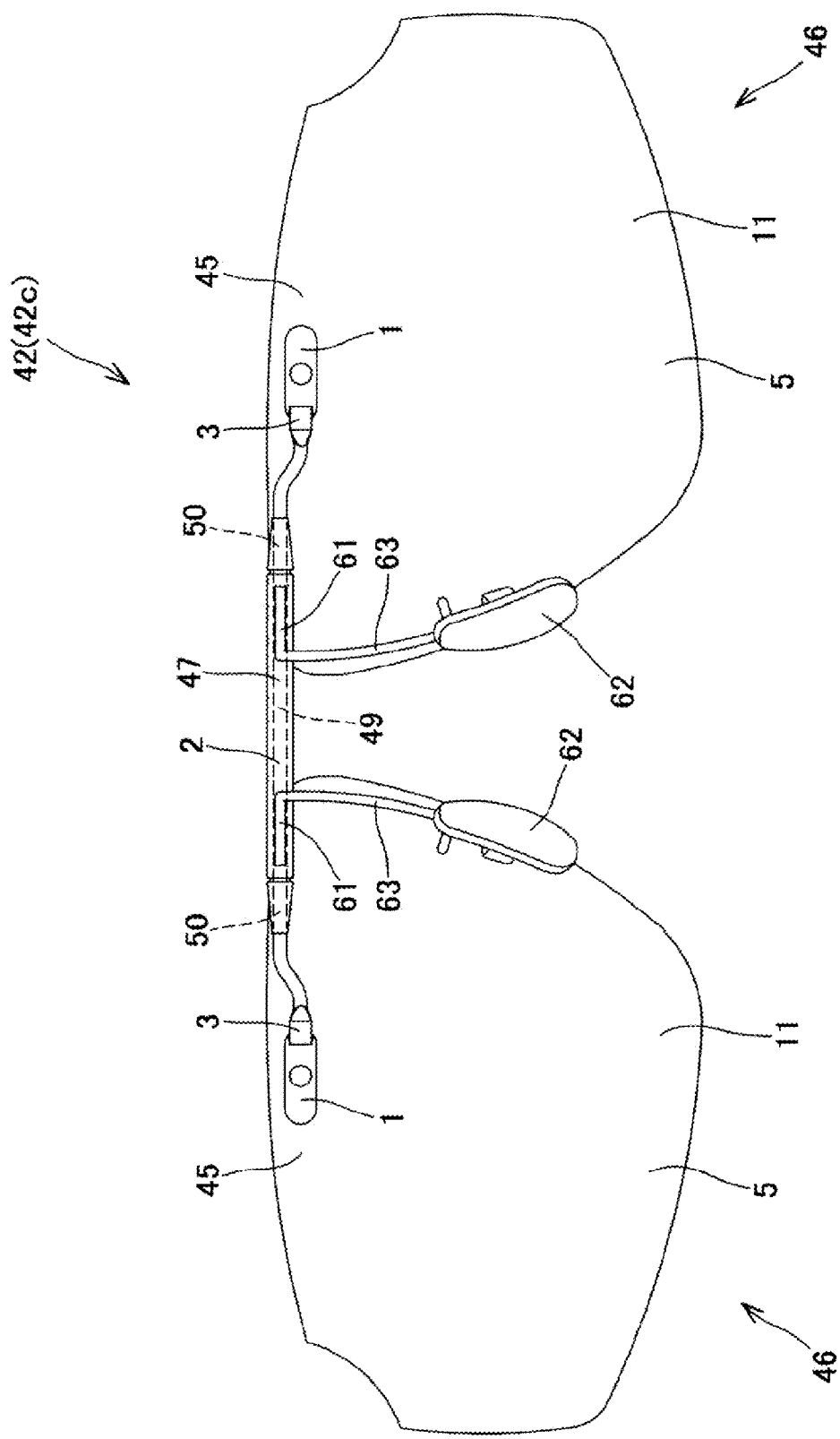
FIG. 18 is a front view showing flip-up eyeglasses where the lenses with a connector are mounted to the lens connecting member.
Figure 19:
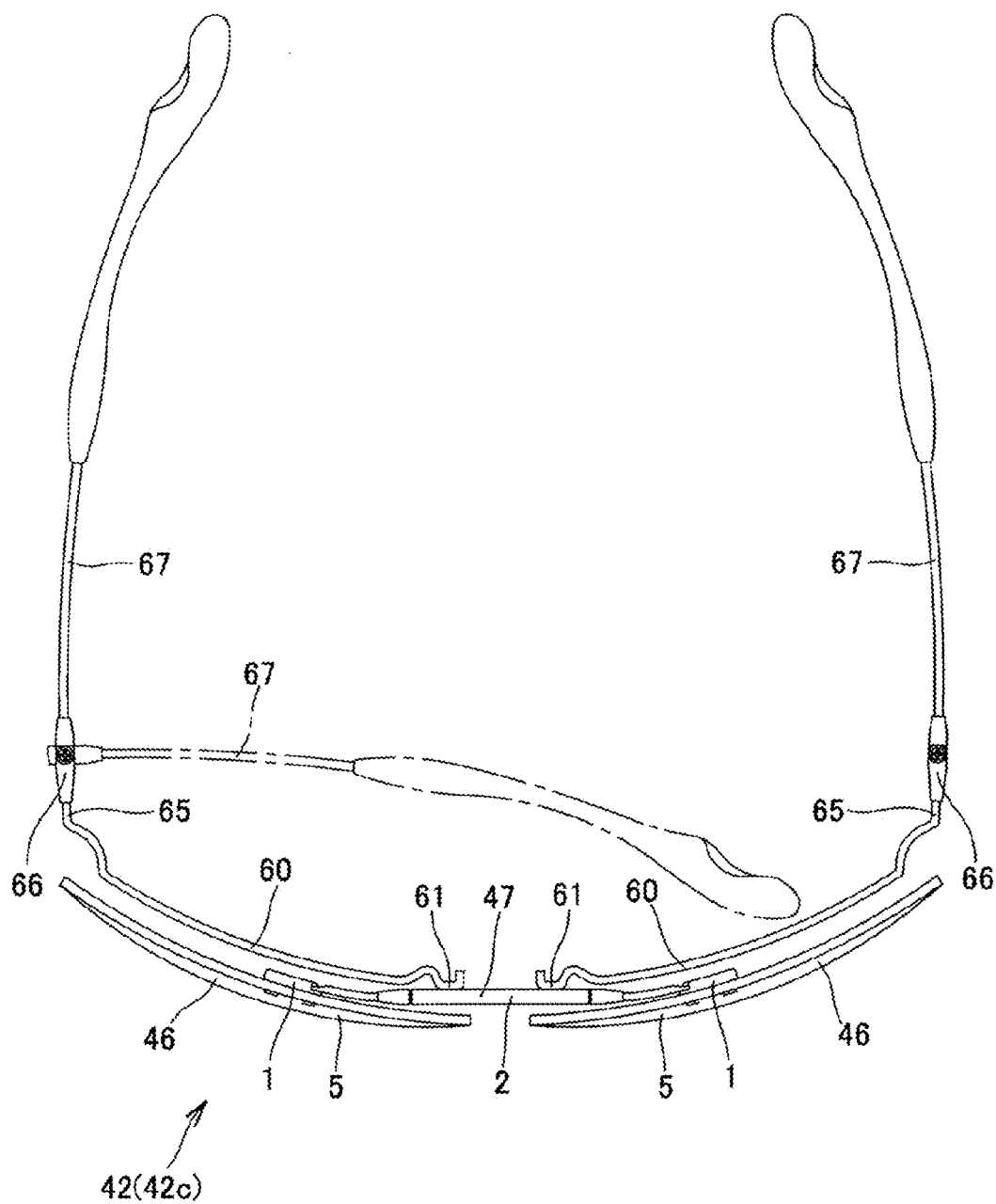
FIG. 19 is a plane view thereof.

The third eyeglasses 42c shown in FIGS. 18 to 19 are a flip-up type formed, for example, as sunglasses, and when the flip-up eyeglasses 42c are turned downward and are down, the state where the sunglasses are clipped on is obtained. Concurrently, when the flip-up type eyeglasses 42c are flipped up, the state of no eyeglasses (viewing with naked eyes) can be obtained.

As shown in FIG. 19, inner ends 61 of right and left bowed upper-frame sections 60 are attached to either side of the center of the tubular support shaft 47 by brazing, and as shown in FIG. 18, pad arms 63 having nose pads 62 are formed on, as bent continuations of, the inner ends 61. Further, temple connecting pieces 66 are curved and formed on outer ends 65 of the right and left bowed upper-frame sections 60 as shown in FIG. 19, and a temple 67 is mounted to the temple connecting pieces 66 to be openable/closable.

The right and left lenses 5 can be flipped up as similar to FIG. 9. This flipped-up state is stably maintained by the engagement in conjunction with the spring action. For example, when a user stays inside not requiring sunglasses or when a driver enters into a tunnel during driving a car, he/she can see things with naked eyes by flipping up the lenses, and the safety driving can be secured.

Embodiment 3

Figure 20:
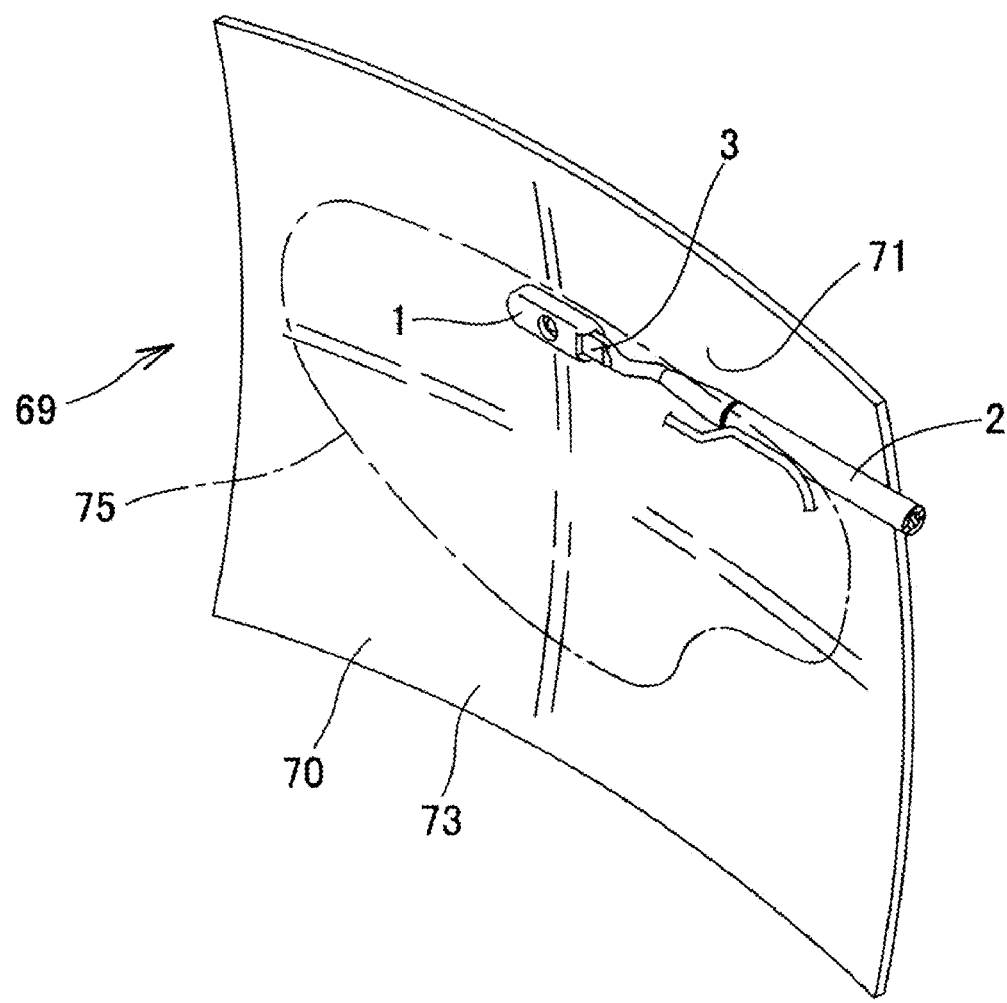
FIG. 20 is a perspective view showing a lens forming substrate.
Figure 21:
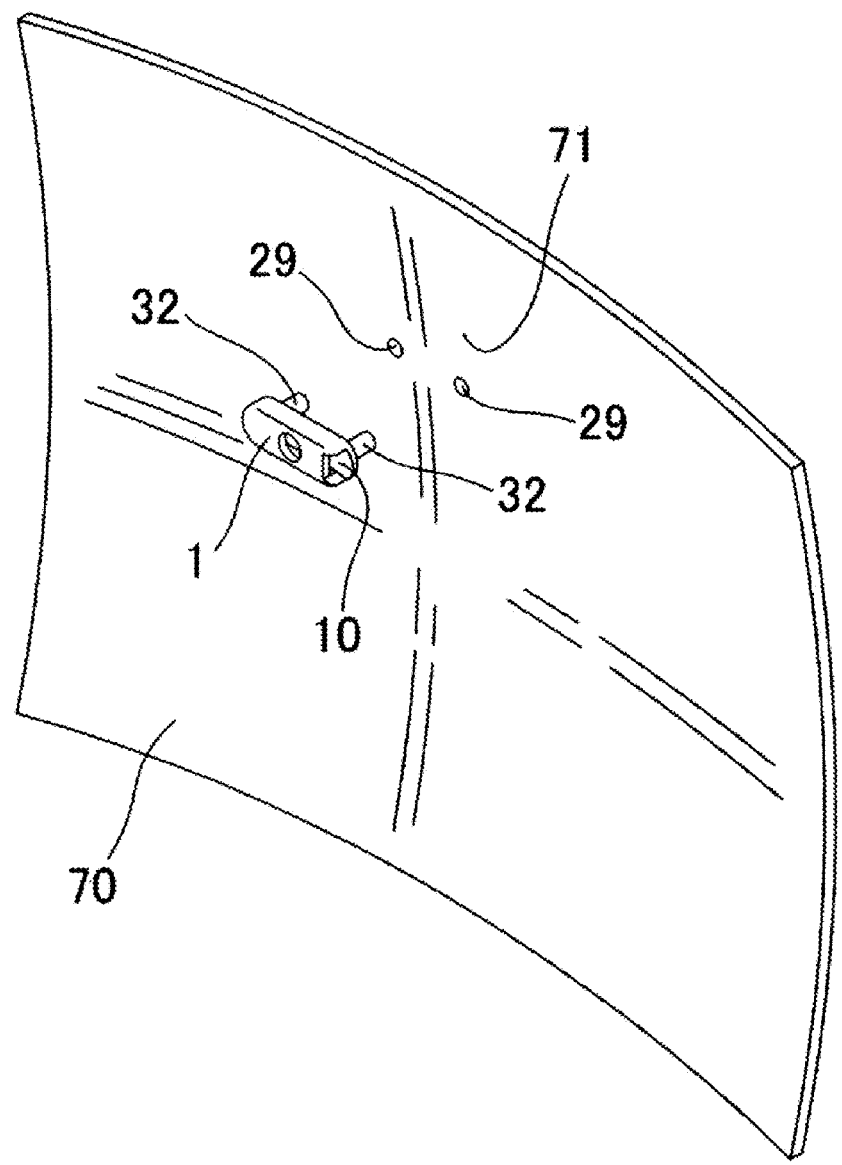
FIG. 21 is a perspective view showing the lens forming plate and the lens connector.

FIGS. 20 to 21 show an embodiment of a lens forming substrate 69 relating to the present invention, and the lens connector 1 is secured to a plastic lens forming plate 70 enabling to form a lens with the required shape by cut processing.

The lens forming plate 70 is formed, for example, to be a rectangular plate with a lens curve, and the lens connector 1 is secured to one margin portion of the inner surface (a portion to be an edge on the inner surface of the cut formed lens) by adjusting the hole center of the insertion hole 10 along the one side edge 71. The securing method is similar to the other embodiments.

Then, when forming a lens with a connector 46 where the lens connector 1 is secured, when the insertion pieces 3 are inserted into the insertion holes 10 of the lens connector 1 and the engagement protrusions 9 and the engagement holes 39 are fitted and engaged, a required lens outline is marked, for example, as shown with a dashed line in FIG. 20, a required lens outline 75 is marked so as to enable to cut-process the desired lens shape on the surface 73 of the lens forming plate 70.

After the lens outline 75 is marked, the lens forming substrate 69 is detached from the lens connecting member 2, and the lens is cut along the lens outline 75 with scissors in this state, and cut portions are polished. For example, the lens is cut to the preferred shape, such as a lens with notch as shown in FIG. 18, heart-shaped or rhombus, and the lenses with a connector 46 with the required shape are formed. Since such cutting work can be conducted by separating the lens formatting plate 70 from the lens connecting member 2, the cutting work can be easily and accurately conducted. If the lens forming plate 70 is secured to the lens connecting member 2 to be rivet-state as in the conventional example, cutting work has to be conducted in a state in which lens forming plate 70 is secured to the lens connecting member 2; however, this limits the cutting work, and a problem where cutting cannot be conducted easily and accurately occurs.

Embodiment 4

The present invention is not limited to those shown in the embodiments, but it is needless to say, various designs are modifiable. Examples are mentioned below.

(1) As long as using the method to maintain the insertion pieces 3 into the insertion holes, the lens connector 1 may be formed with any method not limiting to the embodiments. For example, the protrusion does not protrude toward the face side but protrude vertically, and holes do not have to be established in the connector body, but engagement sections may be established inside the body (FIG. 22 (A)).

(2) The engagement protrusion 9 placed in the insertion piece 3 is preferably spherical as described above. However, as long as the engagement protrusion 9 can be engaged with the engagement concave portion or the engagement hole placed in the connector body 6 in the fitted state, for example, the engagement protrusion 9 can be a circular truncated cone, and it is not specified to the spherical one.

Figure 22A:
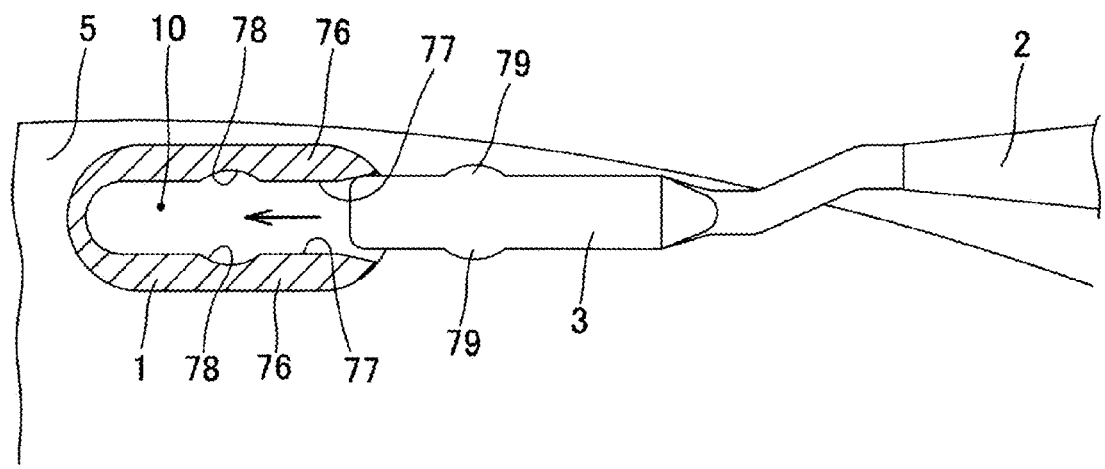
FIGS. 22A and 22B are cross sectional views showing an engagement state between the insertion pieces and the insertion holes and another mode of fastening pin.

(3) FIG. 22 shows another embodiment of the lens connector 1, and an engagement concave portion 78 or engagement hole is established on the insertion hole inner surface 77, such as both-side surfaces 76 and 76 of the insertion hole 10, and the engagement protrusion 79 established in the insertion piece 3 is designed to be engaged with the engagement concave portion 78. Alternatively, concavity and convexity may be reverse.

(4) Even with other methods, as long as the construction where the connector body is tightly fitted into the engagement protrusion, any construction is acceptable.

Figure 22B:
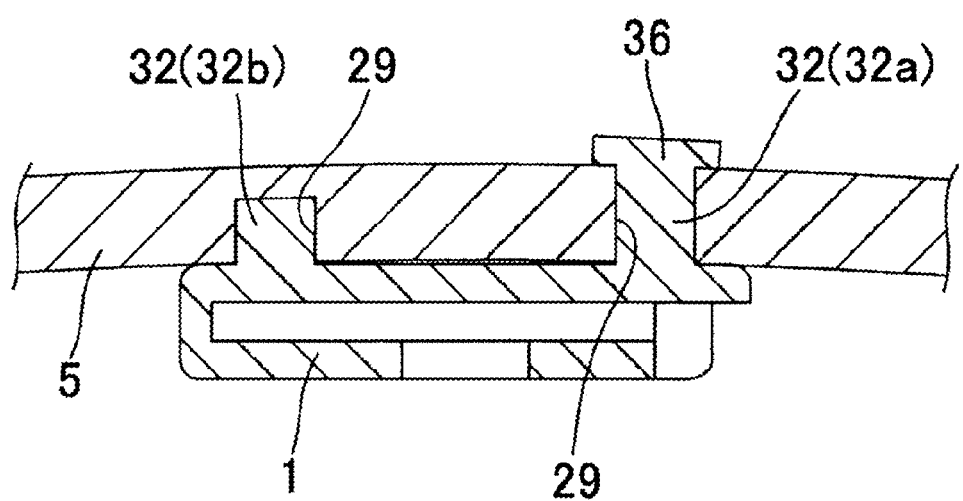

(5) In these embodiments, while two fastening pins 32 jotting out from the anchored attachment surface 21 of the connector body 6 are inserted into the fastening holes 29 established in the lens 5, the retaining protrusion 36 is formed by crushing the protrusion 33, and this pin may be one, and in that case, it becomes possible to prevent the rotation after connecting with a device to make the shape of the protrusion or the fastening hole rectangular. However, in order to stably secure them, for example, as shown in FIG. 22B, it is configured such that other fastening pins 32b are simply inserted into the fastening holes 29 and a baffling function of the lens connector 1 can be demonstrated. In this case, for the end 93 of the fastening pin 32b for baffling, the length should be set not to protrude from the surface of the lens 5. Furthermore, it is preferable that the other fastening pin 32a protrudes with the floor guide-part 16 to enable improving the stability of securing the floor guide-part 16.

(6) The cross-sectional form of the insertion hole 10 can be configured in a variety of forms, including round, hexagonal, rectangular, square and elliptical forms, with the cross-sectional form of the insertion piece 3 being configured to fit such cross-sectional forms of the insertion hole 10.

What is claimed is:

1. An eyeglass-lens connection fitting for anchored attachment onto a surface of a lens for interchangeable-lens eyeglasses, the lens connection fitting for connection with an insertion piece of an inter-lens linking member, and comprising:
   a connector body having an attachment side where the lens connection fitting anchors onto the lens surface, the connector body provided with an insertion socket into a mouth of which the insertion piece is detachably insertable;
   a floor guide-part protruding from the mouth of the insertion socket, as an extension of the lens-attachment side of the connector body, for guiding the insertion piece into the socket mouth; and
   one or more fastening pins jutting exteriorly from the lens-attachment side of the connector body, each fastening pin for insertion into a proximal end of a corresponding fastening hole penetrating the lens, and being of length extensive enough to jut out as a retaining protrusion from a distal end of the fastening hole, with the retaining protrusion being crushable to lock the pin onto the lens area surrounding the distal end of the fastening hole.

2. The eyeglass-lens connection fitting according to claim 1, wherein said connector body is formed with opposing lateral guide portions flanking the mouth of the insertion socket and standing perpendicular to the floor guide-part.

3. The eyeglass-lens connection fitting according to claim 1, wherein:
   said connector body is formed with lateral guide portions flanking the mouth of the insertion socket and standing perpendicular to the floor guide-part; and
   the lateral guide portions are each tapered heading away from the insertion-socket mouth toward a distal end of the floor guide-part to form an insertion-piece guiding surface, whereby the guiding surfaces of the opposing lateral guide portions are separated by a gap that expands heading toward the distal end of the floor guide-part.

4. The eyeglass-lens connection fitting according to claim 1, wherein said connector body is formed with an insertion-piece engagement conformation on the inner surface of the insertion socket, for engaging with a complementary engagement protrusion on the insertion piece when the insertion piece is fitted into the insertion socket.

5. The eyeglass-lens connection fitting according to claim 1, wherein at least one of the fastening pins is located on the lens-attachment side of the floor guide-part.

6. The eyeglass-lens connection fitting according to claim 1, wherein the lens-attachment side of the connector body is formed curved so as to be flush with the surface of the lens when the lens connection fitting is attached to the lens and anchored thereto by means of the crushable retaining protrusions.

7. The eyeglass-lens connection fitting according to claim 1, wherein the one or more fastening pins is a single pin formed noncircular in transverse section to match the lens fastening hole correspondingly being noncircular.

8. Interchangeable-lens eyeglasses, comprising:
a pair of lenses each penetrated by one or more fastening holes for engagement with an eyeglass-lens connection fitting;
an inter-lens linking member terminating, on opposing ends, in insertion pieces; and
secured to each lens of said pair of lenses, an eyeglass-lens connection fitting according to claim 1; wherein:
the fastening pins on said connector body of each lens connection fitting are inserted into the corresponding fastening holes in said pair of lenses, with the retaining protrusions being crushed to lock the pins onto the lenses; and
the insertion pieces of said inter-lens linking member are each inserted into the insertion socket of a corresponding one of said pair of lenses.

9. Interchangeable-lens eyeglasses according to claim 8, wherein said pair of lenses is formed unitarily as a single piece, with the lenses being joined by a bridge portion.

10. The eyeglass-lens connection fitting according to claim 1, being secured to a plastic lens-forming substrate by means of the fastening pins on said connector body being fitted into corresponding fastening holes in said lens-forming substrate, with the retaining protrusions being crushed to lock the pins onto said substrate, said substrate suited to being cut-processed into a lens of required shape.

11. A flip-up eyeglass inter-lens linking member for forming, by detachable connection with lens connection fittings, interchangeable-lens eyeglasses, the inter-lens linking member comprising:
a tubular support shaft; and
a rotary axle extending through said tubular support shaft and terminating in insertion pieces capping said tubular shaft endwise, each said insertion piece being constituted so as to be insertable into the insertion socket of a lens connection fitting according to claim 1 and be detachably engageable with the connector body of the lens connection fitting.

12. The inter-lens linking member according to claim 11, further comprising curved elastic lens clips affixed laterally to said tubular support shaft along either end thereof.

13. A flip-up eyeglass frame comprising:
an inter-lens linking member according to claim 11;
left and right bowed upper-frame sections having inner ends affixed laterally to said tubular support shaft, flanking the midportion thereof;
pad arms having on lower ends thereof nose pads, said pad arms being formed on, as bent continuations of, the inner ends of said left and right bowed upper-frame sections;
temple connectors formed on, curving rearward from, outer ends of said left and right bowed upper-frame sections; and
temples openably/closably mounted on said temple connectors.

\* \* \* \* \*